(12) United States Patent
Nakaishi et al.

(10) Patent No.: US 7,366,607 B2
(45) Date of Patent: Apr. 29, 2008

(54) NAVIGATION APPARATUS

(75) Inventors: Shinichi Nakaishi, Kobe (JP); Hideki Matsui, Kobe (JP); Akira Motojima, Kobe (JP); Yuji Tomita, Kobe (JP); Masanobu Maeda, Kobe (JP); Minoru Maehata, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 457 days.

(21) Appl. No.: 10/994,607

(22) Filed: Nov. 23, 2004

(65) Prior Publication Data

US 2005/0128106 A1    Jun. 16, 2005

(30) Foreign Application Priority Data

Nov. 28, 2003 (JP) ............................. 2003-400386
Sep. 27, 2004 (JP) ............................. 2004-280352

(51) Int. Cl.
G08G 1/0962 (2006.01)
G01C 21/10 (2006.01)

(52) U.S. Cl. ..................................... 701/211
(58) Field of Classification Search ................. None
See application file for complete search history.

(56) References Cited

U.S. PATENT DOCUMENTS

| | | | | |
|---|---|---|---|---|
| 4,866,776 A | * | 9/1989 | Kasai et al. | 381/302 |
| 5,406,492 A | * | 4/1995 | Suzuki | 701/211 |
| 5,923,256 A | * | 7/1999 | Satake et al. | 340/575 |
| 5,935,193 A | * | 8/1999 | Saiki | 701/211 |
| 6,172,641 B1 | * | 1/2001 | Millington | 342/357.13 |
| 6,694,255 B1 | | 2/2004 | Kainuma et al. | |
| 2003/0142835 A1 | * | 7/2003 | Enya et al. | 381/86 |
| 2005/0004747 A1 | | 1/2005 | Abe | |

FOREIGN PATENT DOCUMENTS

| | | |
|---|---|---|
| CN | 1304120 A | 7/2001 |
| JP | A 64-19500 | 1/1989 |
| JP | 06-176296 A | 6/1994 |
| JP | 07-057190 A | 3/1995 |
| JP | A 07-083674 | 3/1995 |
| JP | A 07-159190 | 6/1995 |
| JP | 08-110237 A | 4/1996 |
| JP | 2001-289660 | * 10/2001 |
| WO | WO 03/046480 A1 | 6/2003 |

* cited by examiner

*Primary Examiner*—Michael J. Zanelli
(74) *Attorney, Agent, or Firm*—Oliff & Berridge, PLC

(57) ABSTRACT

A navigation apparatus includes a guidance-information creating unit that creates guidance information by acquiring a guiding direction, in which a vehicle should be guided, from preset route information and current position information; an acoustic-image creating unit that creates an acoustic image for notifying a driver of the guidance information; and an acoustic-image control unit that changes at least one of a movement start position of the acoustic image, a direction change position of the acoustic image, a moving amount of the acoustic image, a moving speed of the acoustic image, and a moving locus of the acoustic image according to the current position information and a guiding position in the preset route information.

32 Claims, 22 Drawing Sheets

FIG.15A

| LENGTH OF EXAMPLE SENTENCE OF VOICE GUIDANCE | | MOVING SPEED OF ACOUSTIC IMAGE |
|---|---|---|
| LONG | 20 CHARACTERS OR MORE | A (m/s) |
| MEDIUM | 15 CHARACTERS OR MORE AND LESS THAN 20 CHARACTERS | B (m/s) |
| SHORT | LESS THAN 15 CHARACTERS | C (m/s) |

(NOTE) A > B > C

FIG.15B

| GUIDING DIRECTION | MOVING SPEED OF ACOUSTIC IMAGE |
|---|---|
| REAR DIRECTION | REDUCE BY D(m/s) |
| DRIVER DIRECTION (RIGHT DIRECTION) | REDUCE BY E(m/s) |

FIG.15C

| SPEED OF OWN VEHICLE | | MOVING AMOUNT OF ACOUSTIC IMAGE |
|---|---|---|
| HIGH SPEED | 80 (km/h) OR MORE | SET TO SMALL |
| MEDIUM SPEED | 40 (km/h) OR MORE AND LESS THAN 80 (km/h) | SET TO NORMAL |
| LOW SPEED | LESS THAN 40 (km/h) | SET TO LARGE |

| VOLUME LEVEL ACTUALLY OUTPUTTED AS REPRODUCED MUSIC | ATT AMOUNT (ATTENUATION AMOUNT) |
|---|---|
| LARGE F(dB) OR MORE | H(dB) |
| MEDIUM G(dB) OR MORE AND LESS THAN F(dB) | J(dB) |
| SMALL LESS THAN G(dB) | K(dB) |

(NOTE) H > J > K

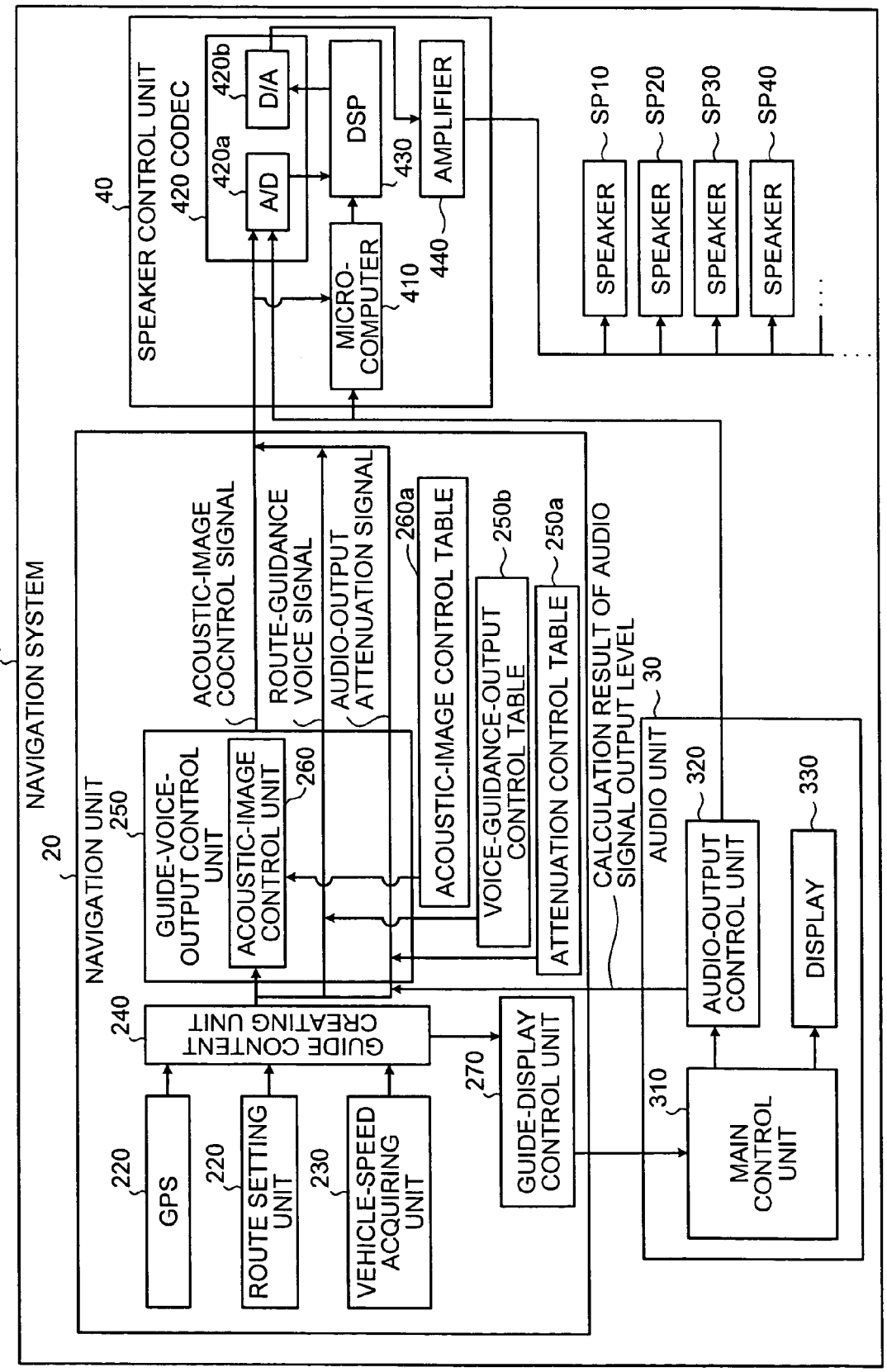

FIG.22A

| DISTANCE FROM OWN VEHICLE TO GUIDE POINT | FREQUENCY BAND THAT SHOULD BE OUTPUTTED AS VOICE GUIDANCE |
|---|---|
| NEAR | L (Hz) ~ M (Hz) |
| FARTHER THAN NEAR AND LESS THAN 300m | N (Hz) ~ P (Hz) |
| 300 M OR MORE AND LESS THAN 700m | Q (Hz) ~ R (Hz) |

| SPEED OF OWN VEHICLE | | OUTPUT LEVEL OF VOICE GUIDANCE |
|---|---|---|
| HIGH SPEED | 80 (km/h) OR MORE | S (dB) |
| MEDIUM SPEED | 40 (km/h) OR MORE AND LESS THAN 80 (km/h) | T (dB) |
| LOW SPEED | LESS THAN 40 (km/h) | U (dB) |

250b (NOTE) S > T > U

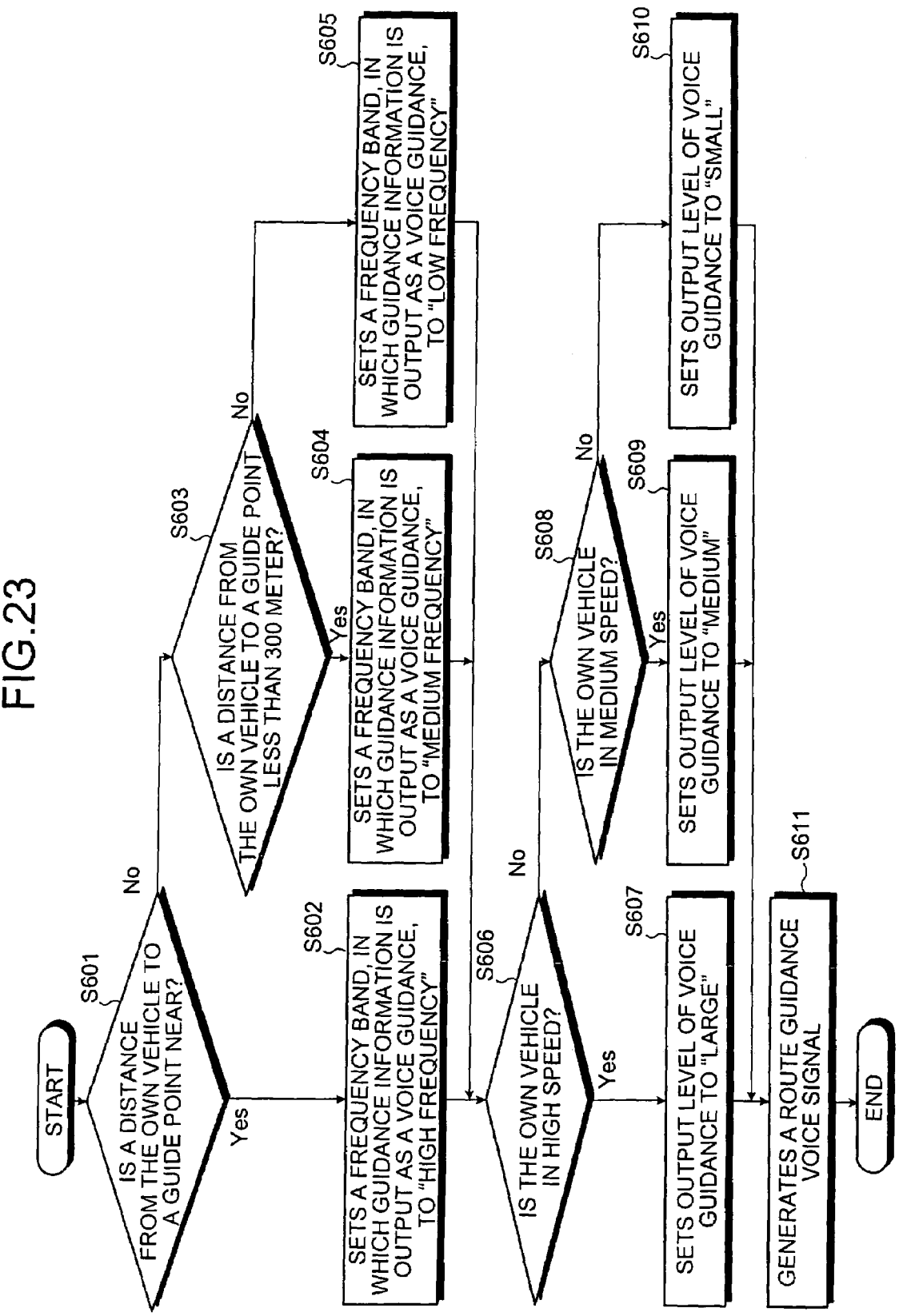

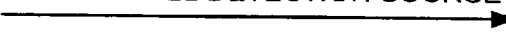

VOICE OUTPUT PRIORITY SETTING RECEPTION SCREEN

NAVIGATION APPARATUS

BACKGROUND OF THE INVENTION

1) Field of the Invention

The present invention relates to a navigation apparatus that performs a route guidance based on preset route information and current position information with an improved guiding effect for a driver.

2) Description of the Related Art

Conventionally, a navigation apparatus, which registers a planned route of its own vehicle and performs route guidance by voice, has been realized. This navigation apparatus specifies a crossing where its own vehicle turns to the right or the left based on planned route information, map information, and a present location and notifies a driver of the crossing in advance to thereby cause the driver to drive according to a set route.

In this case, both screen display and a voice output are used for the notification to the driver. However, since it is not preferable to cause the driver to keep his/her eyes fixed on a display while the driver drives a vehicle, notification by voice is extremely useful. Thus, in the navigation apparatus, it has been an important problem how to increase an amount of information in a voice output and realize effective route guidance without imposing a burden on vehicle operation by the driver.

Therefore, for example, in Japanese Patent Application Laid-Open Publication No. H7-57190, a navigation apparatus performs control such that a guide voice from the navigation apparatus is heard from a relative angle direction with respect to a driver to thereby use a direction of the voice as information. Similarly, Japanese Patent Application Laid-Open Publication No. H6-176296 discloses a technology for localizing an acoustic image in a direction of road guidance to output voice data. Japanese Patent Application Laid-Open Publication No. H8-110237 discloses a technology for changing a localization direction of notification sound according to a state of a route to perform route guidance.

Moreover, in recent years, there has been a development of a navigation apparatus that performs acoustic image localization control for moving an acoustic image of voice guidance urging a user to operate a vehicle in a guiding direction (i.e., sense of movement control (sense of direction control) giving a driver a sense of movement in the guiding direction) according to a behavior of its own vehicle estimated from the guiding direction based on preset route information and position information of its own vehicle.

However, when a direction of a voice output is localized in a guiding direction as in the conventional technologies described above, a driver may be confused if the driver is guided to different directions continuously. For example, when the navigation apparatus guides the driver with a voice "turn to the right at the next crossing and turn to the left at a traffic light ahead", the voice is outputted from the right direction and, immediately after this, the voice is outputted from the left side. Thus, the driver is conscious of information on the left direction that is heard later. In other words, although it is possible to recognize information by a sentence (contents of a voice) on the driver side as information in time series, it is difficult to recognize information on a direction of sound in time series because later information denies earlier information. Thus, a complicated change in a voice direction requires the driver a labor of "memorizing an order of directions from which sound is heard".

In addition, in particular, when a guiding direction is the rear or is the left or the right on a rear side, that is, guidance in which a curvature changes largely is performed, if a guide voice is outputted from the rear side, guidance is performed from a direction in which a voice is hard to hear for human ears. Thus, it is likely that the driver misses the guidance. Moreover, even if a route has a large curvature, in actual driving, the navigation apparatus gradually changes a traveling direction of its own vehicle to finally adjust an orientation of its own vehicle to a desired direction. A voice output from a direction opposed to the traveling direction of the own vehicle or a direction near the direction is divergent from a behavior of the own vehicle.

In short, in the conventional technologies described above, there is a problem in that, when an amount of information of a voice output is increased, easiness of listening on a driver side is not taken into account and information divergent from an actual behavior of a vehicle may be added. Thus, it is a conventional problem to increase an amount of information in a voice output without imposing a burden on a driver to thereby improve an effect of route guidance.

In addition, the conventional technologies described above simply perform acoustic image localization control for uniformly moving acoustic images of voice guidance. Thus, there is a problem in that an appropriate sense of movement is not always given to a driver and there is naturally a limit in performing effective route guidance.

For example, in the conventional technologies described above, if acoustic image localization control for moving an acoustic image of relatively short voice guidance of "to the right direction ahead" is performed based on moving speed of an acoustic image at the time when voice guidance of "to the right direction at a crossing ahead", a voice output of the voice guidance ends before the movement of the acoustic image converges. Thus, it is impossible to give a driver an appropriate sense of movement. In addition, if acoustic image localization control for moving an acoustic image of relatively long voice guidance of "to the right direction at a first traffic signal ahead" is performed, a sense of incompatibility is caused in that, although movement of the acoustic image converges, the voice guidance continues to be outputted.

In general, since a seating position of a driver is on the right side (or the left side) of a vehicle rather than the center of the vehicle, a space in which an acoustic image can be moved in front of the driver is asymmetrical. Therefore, when route guidance to a direction of a seat of the driver (e.g., the right direction) is performed, as usual, even if it is attempted to move an acoustic image of voice guidance in the right direction from the front of the driver, since the right side of the driver is near a door or a window, a moving distance of the acoustic image is limited. Thus, it is difficult to transmit a sense of movement in the guiding direction (right direction) effectively.

Consequently, in addition to transmitting information according to contents meant by voice, it is an extremely important problem how to realize "sense of movement control" excellent in information transmission according to acoustic image movement, that is, how to clearly transmit a sense of movement in a guiding direction to a driver.

SUMMARY OF THE INVENTION

It is an object of the present invention to solve at least the above problems in the conventional technology.

A navigation apparatus according to one aspect of the present invention, which performs a route guidance for a vehicle based on preset route information and current position information, includes a guidance-information creating unit that creates guidance information by acquiring a first guiding direction, in which the vehicle should be guided, and a second guiding direction, in which the vehicle should be guided following the first guiding direction, from the preset route information and the current position information; an acoustic-image creating unit that creates an acoustic image for notifying a driver of the guidance information; and an acoustic-image control unit that determines, when the guidance information is notified continuously, a direction of movement of the acoustic image in a single direction.

A navigation apparatus according to another aspect of the present invention, which performs a route guidance for a vehicle based on preset route information and current position information, includes a guidance-information creating unit that creates guidance information by acquiring a guiding direction, in which the vehicle should be guided, from the preset route information and the current position information; an acoustic-image creating unit that creates an acoustic image for notifying a driver of the guidance information; and an acoustic-image control unit that changes at least one of a movement start position of the acoustic image, a direction change position of the acoustic image, a moving amount of the acoustic image, a moving speed of the acoustic image, and a moving locus of the acoustic image according to the current position information and a guiding position in the preset route information.

A navigation apparatus according to still another aspect of the present invention, which performs a route guidance for a vehicle based on preset route information and current position information, includes a guidance-information creating unit that creates guidance information by acquiring a guiding direction, in which the vehicle should be guided, from the preset route information and the current position information; an acoustic-image creating unit that creates an acoustic image for notifying a driver of the guidance information; and an acoustic-image control unit that changes a moving speed of the acoustic image according to at least one of an example sentence structure of the guidance information and an environment in which the guidance information is heard.

The other objects, features, and advantages of the present invention are specifically set forth in or will become apparent from the following detailed description of the invention when read in conjunction with the accompanying drawings.

BRIEF DESCRIPTION OF THE DRAWINGS

FIGS. 15A to 15C are diagrams of examples of a structure of information stored in an acoustic image control table;

FIG. 21 is a schematic diagram of a schematic structure of a navigation system according to a third embodiment of the present invention;

FIGS. 22A and 22B are diagrams of examples of a structure of information stored in a voice guidance output control table;

FIG. 23 is a flowchart of a procedure of route guide voice signal generation processing according to the third embodiment;

FIG. 24 is a diagram of an example of a sense of movement control setting screen;

FIG. 25 is a diagram of an example of a voice guidance volume control screen.

DETAILED DESCRIPTION

Exemplary embodiments of a navigation apparatus according to the present invention will be hereinafter explained in detail with reference to the accompanying drawings.

Figure 1:
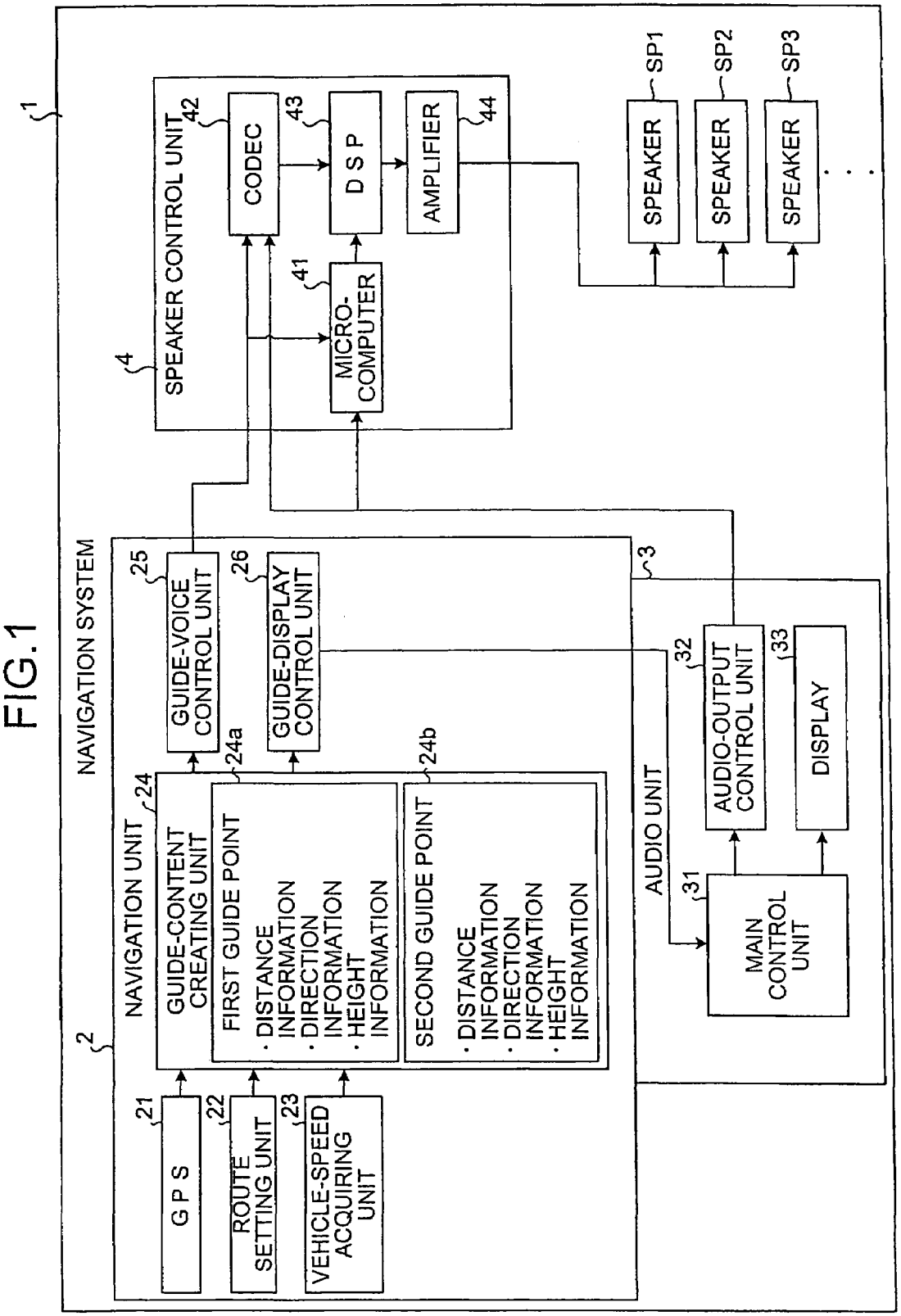
FIG. 1 is a schematic diagram of a schematic structure of a navigation system according to a first embodiment of the present invention.

FIG. 1 is a schematic diagram of a schematic structure of a navigation system 1 according to a first embodiment of the present invention. The navigation system 1 includes a navigation unit 2, an audio unit 3, a speaker control unit 4, and speakers SP1 to SP4.

The navigation unit 2 includes a global positioning system (GPS) receiving unit 21, a route setting unit 22, a vehicle speed acquiring unit 23, a guide content creating unit 24, a guide voice control unit 25, and a guide display control unit 26. Here, the GPS receiving unit 21, the route setting unit 22, the vehicle speed acquiring unit 23, the guide content creating unit 24, the guide voice control unit 25, and the guide display control unit 26 may be constituted by microcomputers or the like or may be constituted by electronic circuits. These units are divided according to functions. In a physical structure, all or a part of the units may be integrated.

The GPS receiving unit 21 receives information from a GPS satellite to acquire time information and specifies position information of its own vehicle. In addition, the GPS receiving unit 21 outputs the specified position of its own vehicle to the guide content creating unit 24.

The route setting unit 22 is a processing unit that sets and stores a planned route of its own vehicle in response to a user input from a driver or the like. The route setting unit 22 outputs a set route and map information to the guide content creating unit 24.

The vehicle speed acquiring unit 23 acquires vehicle speed information of its own vehicle and outputs the vehicle speed information to the guide content creating unit 24. Note that the vehicle speed acquiring unit 23 may acquire the vehicle information from a speedometer of its own vehicle or may calculate the vehicle speed information from transition of the position information specified by the GPS receiving unit 21.

The guide content creating unit 24 creates contents to be notified to a driver of a vehicle based on outputs of the GPS receiving unit 21, the route setting unit 22, and the vehicle speed acquiring unit 23. More specifically, the guide content creating unit 24 stores information on a location where voice guidance should be performed next for the driver as first guide point information 24a and stores information on a location where voice guidance should be performed for the driver following the first guide point as second guide point information 24b. Here, a guide point is a location where the navigation system 1 judges a guide voice should be outputted to a driver based on planned route information, current position information, and map information of its own vehicle. This judgment, that is, judgment on "in which location a guide voice should be outputted" is the same as that in the conventional technologies, an explanation of the judgment is omitted here.

Contents of the first guide point information are, more specifically, distance information indicating a distance from a current position of the own vehicle to the location (first guide point), direction information indicating a direction that the own vehicle should take in that location, and height information indicating a height of that location. Similarly, contents of the second guide point are distance information indicating a distance from the first guide point to the location (second guide point), direction information indicating a direction that the own vehicle should take in that location, and height information indicating a height of that location. Note that the distance information in the second guide point information may be information indicating a distance from the current position of the own vehicle to the second guide point.

For example, when the own vehicle turns to the right at a crossing 300 meters ahead of the current position and turns to the left at a traffic signal after the right turn, the first guide point is the crossing 300 meters ahead and the second guide point is the signal after the right turn.

The guide content creating unit 24 determines contents of route guidance using the first guide point information and the second guide point information. The guide content creating unit 24 outputs contents, which are outputted by voice, to the guide voice control unit 25 and outputs contents, which are displayed on a display, to the guide display control unit 26.

The guide voice control unit 25 determines from which direction guide voice is outputted to a driver based on the output of the guide content creating unit 24 and transmits the determination to the speaker control unit 4. The guide display control unit 26 transmits contents to be displayed on a display to the audio unit 3 based on the output of the guide content creating unit 24.

The audio unit 3 includes a main control unit 31, an audio output control unit 32, and a display 33. Here, the main control unit 31 and the audio output control unit 32 may be constituted by microcomputers or the like or may be constituted by electronic circuits. These units are divided according to functions. In a physical structure, both the units may be integrated.

The main control unit 31 is a control unit that controls the entire audio unit 3. For example, if the audio unit 3 is a digital versatile disk (DVD) player, the main control unit 31 reads out music information and the like stored in a DVD disk and outputs the music information and the like to the audio output control unit 32 and also reads out video information and the like and displays the video information and the like on the display 33. The audio output control unit 32 transmits the music information outputted by the main control unit 31 to the speaker control unit 4. Note that this audio unit 3 is not limited to the DVD player and may be an audio unit having functions of a compact disk, a hard disk, a radio, a television, and the like.

Here, the display 33 is also used for image display for route guidance by the navigation unit 2. Thus, in the navigation unit 2, the main control unit 31 has a function of causing the display 33 to display contents received from the guide display control unit 26. In other words, the main control unit 31 reads out information from various media and outputs the information and, at the same time, performs integrated management for the display 33.

The speaker control unit 4 includes a main control unit 41, a codec 42, a digital signal processor (DSP) 43, and an amplifier 44. The main control unit 41, the codec 42, and the DSP 43 may be constituted by microcomputers or the like or may be constituted by electronic circuits. These units are divided according to functions. In a physical structure, the units may be integrated.

The voice information received from the guide voice control unit 25 in the navigation unit 2 and the music information received from the audio output control unit 32 in the audio unit 3 are subjected to a predetermined digital-compression-processing. Thus, the code 42 decodes these voice information and music information with an A/D unit 42a included therein and outputs the voice information and music information to the DSP 43 as sound data.

The main control unit 41 is a control unit that controls the entire speaker control unit 4. More specifically, the main control unit 41 integrally controls a voice output from the navigation unit 2 and a music output from the audio unit 3 and controls from which speaker and with what degree of output voice reproduction and music reproduction should be performed.

The DSP 43 determines output contents from the respective speakers based on the output of the main control unit 41, applies digital signal processing to the output of the A/D unit 42a, and outputs the output to a DA converter unit (D/A unit) 42b in the code 42. An output of the D/A unit 42b is subjected to intensity control and reproduced as voice or music from the speakers SP1 to SP4.

The speakers SP1 to SP4 are arranged as, for example, a right front speaker, a left front speaker, a right rear speaker, and a left rear speaker in a vehicle room. By controlling output intensities of these respective speakers, the speakers can output a voice such that a driver can hear the voice from a desired direction and a desired distance. Voice, which is outputted such that the driver can hear from a virtual position in this manner, will be hereinafter represented as an acoustic image, and a virtual position of the acoustic image is represented as an acoustic image position.

The guide voice control unit 25 determines an acoustic image position, and the main control unit 41 and the DSP 43 adjust a speaker output for realizing the acoustic image position. More specifically, the guide voice control unit 25 determines a position of an acoustic image from the distance information, the direction information, and the height information of the first guide point.

Figure 2:
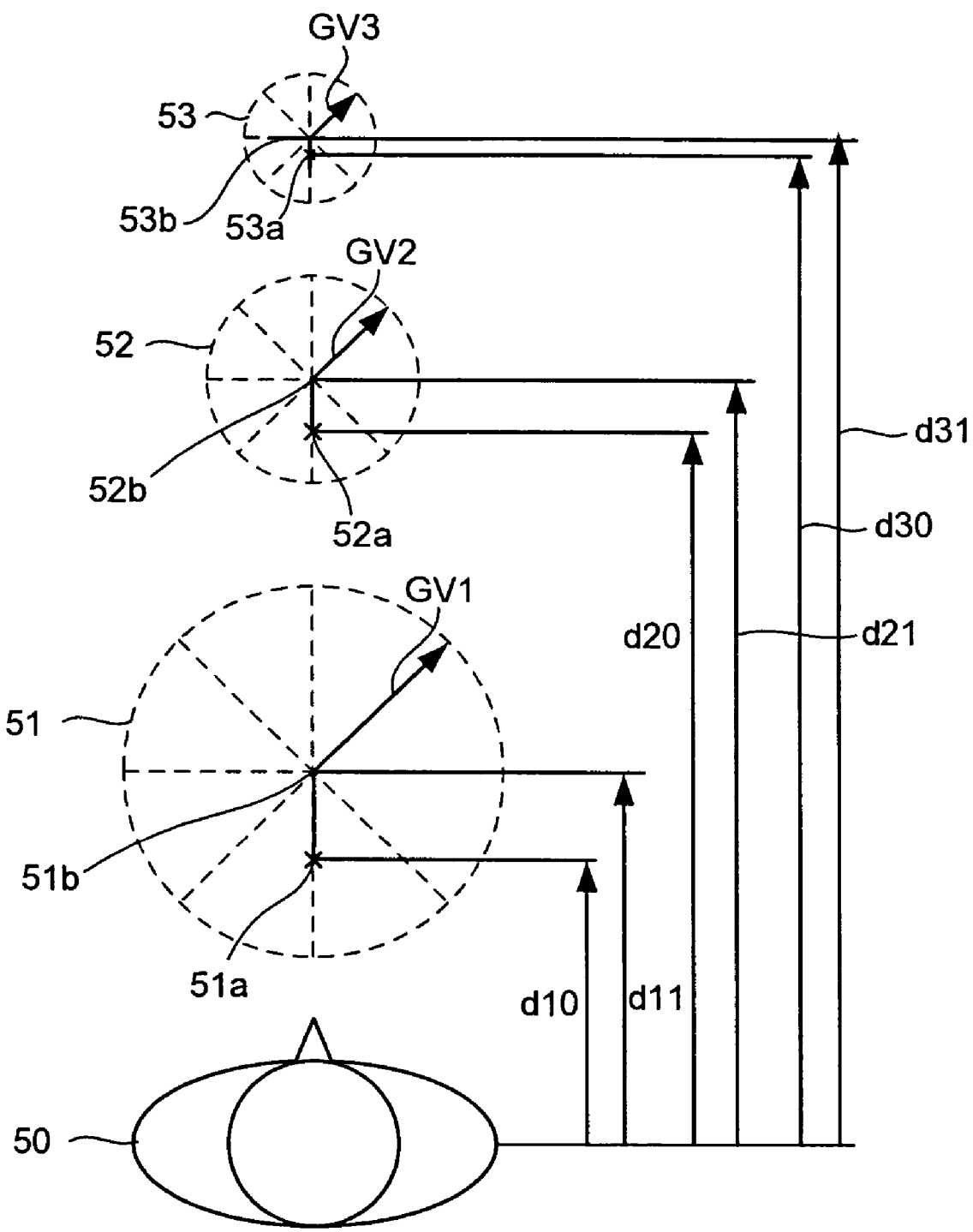
FIG. 2 is an explanatory diagram explaining a specific example of creation of an acoustic image.

FIG. 2 is an explanatory diagram explaining a specific example of the creation of an acoustic image. As shown in the figure, three acoustic image creation ranges 51, 52, and 53 are set for a driver 50. The navigation system 1 uses the acoustic image creation range 51 when the navigation system 1 guides vehicle operation near a current position of its own vehicle. The navigation system 1 uses the acoustic image creation range 52 when the navigation system 1 guides vehicle operation in a medium distance, for example, 300 meters ahead of the current position-of its own vehicle. The navigation system 1 uses the acoustic image creation range 53 when the navigation system 1 guides vehicle operation in a long distance, for example, 700 meters ahead of the current position of its own vehicle.

The acoustic image creation range 51 includes a movement start position 51a and a direction change position 51b. In creating an acoustic image in the acoustic image creation range 51, first, the navigation system 1 creates an acoustic image in the movement start position 51a and moves an acoustic image position together with a voice output. Thereafter, the navigation system 1 changes a direction of movement of the acoustic image from the direction change position 51b to thereby indicate which direction its own vehicle should proceeds according to a direction of movement of the acoustic image.

In the acoustic image creation range 51, the navigation system 1 copes with eight directions, namely, "front", "right front", "left front", "right direction", "left direction", "right rear", "left rear", and "rear" as direction of movements of an acoustic image. Therefore, for example, when the navigation system 1 notifies a driver that a course should be changed to the "right front" at the next crossing, the navigation system 1 creates voice information "to right front at the next crossing", localizes an acoustic image position in the movement start position 51a as indicated by an acoustic image GV1 to start a voice output and moves the acoustic image position during an output of voice information to change a direction of movement to the right front from the direction change position 51b.

Similarly, the acoustic image creation range 52 includes a movement start position 52a and a direction change position 52b. In creating an acoustic image, first, the navigation system 1 creates an acoustic image in the movement start position 52a to move an acoustic image position together with a voice output and changes a direction of movement of the acoustic image from the direction change position 52b. In the acoustic image creation range 52, the navigation system 1 also copes with the eight directions, namely, "front", "right front", "left front", "right direction", "left direction", "right rear", "left rear", and "rear" as direction of movements of an acoustic image.

The acoustic image creation range 53 includes a movement start position 53a and a direction change position 53b. In creating an acoustic image, first, the navigation system 1 creates an acoustic image in the movement start position 53a to move an acoustic image position together with a voice output and changes a direction of movement of the acoustic image from the direction change position 53b. In addition, In the acoustic image creation range 53, the navigation system 1 also copes with the eight directions, namely, "front", "right front", "left front", "right direction", "left direction", "right rear", "left rear", and "rear" as direction of movements of an acoustic image. Note that the acoustic image creation range 53 may be a point that is fixed with respect to the driver 50. In that case, the voice output from this acoustic image creation range 53 does not involve movement of an acoustic image.

The acoustic image creation range 51 is set large compared with the acoustic image creation range 52. In addition, a distance d20 from the driver 50 to the movement start position 52a of the acoustic image creation range 52 and a distance d21 from the driver 50 to the direction change position 52b are set large compared with a distance d10 from the driver to the movement start position 51a of the acoustic image creation range 51 and a distance d11 from the driver 50 to the direction change position 51b, respectively. Similarly, the acoustic image creation range 52 is set large compared with the acoustic image creation range 53. A distance d30 from the driver 50 to the movement start position 53a of the acoustic image creation range 53 and a distance d31 from the driver 50 to the direction change position 53b are set large compared with a distance d20 from the driver 50 to the movement start position 52a of the acoustic image creation range 52 and a distance d21 from the driver 50 to the direction change position 52b, respectively.

Therefore, when the navigation system 1 guides vehicle operation near its own vehicle, a voice of the navigation system 1 is heard near the driver 50, and a moving amount of an acoustic image increases. When the navigation system 1 guides vehicle operation at the medium distance, a voice of the navigation system 1 is heard at a medium distance from the driver 50, and a moving amount of an acoustic image decreases. When the navigation system 1 guides vehicle operation at the long distance, a voice of the navigation system 1 is heard from a distance, and a moving amount of an acoustic image further decreases or the acoustic image does not move.

Consequently, the driver 50 can recognize information on a route, to which vehicle operation is guided, according to not only contents of voice but also movement of the acoustic image. For example, even if guide voice is for guidance to "right rear", "left rear", or "rear", after moving to the front from the movement start positions 51a and 52a, an acoustic position proceeds straight to the direction change positions 51b and 52b and then changes a direction to the rear. Thus, the navigation system 1 can guide vehicle operation in a direction complying with an actual behavior of its own vehicle and can output voice from the front of the driver 50. Consequently, the navigation system 1 can increase an amount of information in a voice output without imposing a burden on the driver 50 and perform effective route guidance.

Figure 3:
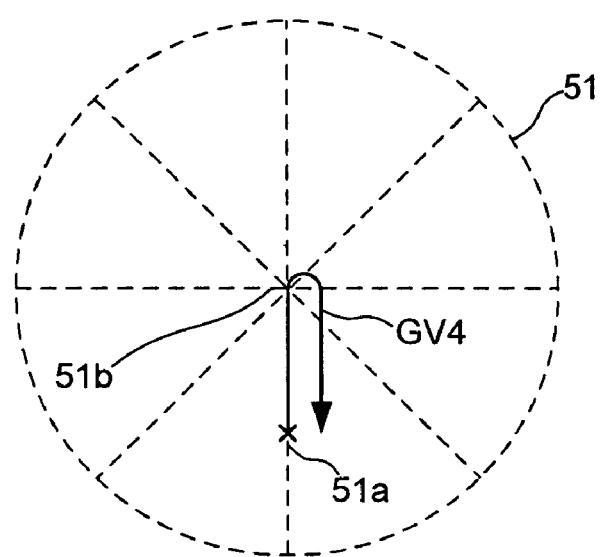
FIG. 3 is an explanatory diagram explaining a specific example at the time when the navigation system performs route guidance to the rear of its own vehicle is performed.

FIG. 3 shows a specific example at the time when the navigation system 1 performs route guidance to the rear of its own vehicle. In the figure, the navigation system 1 creates an acoustic image GV4 in the acoustic image creation range

51. First, the acoustic image GV4. localizes an acoustic image position to the movement start position 51a to start a voice output and moves the acoustic image position during an output of voice information, and the direction of movement changes to the rear from the direction change position 51b.

By moving an acoustic image to the front once in this manner, the navigation system 1 can output a guide voice instructing the driver 50 to turn its own vehicle to the rear in front of the driver 50. In particular, in moving the acoustic image, when the navigation system 1 moves the acoustic image such that an acoustic image position passes a head position of the driver 50, a rate of recognition of a voice falls and, in particular, it becomes difficult to recognize directionality. However, in the acoustic image movement described in this embodiment, the navigation system 1 can prevent the acoustic image from passing the head position of the driver 50 in whichever direction the acoustic image moves.

Incidentally, it is not always necessary to fix a movement start position of an acoustic image and a moving amount of the acoustic image. For example, when speed of the own vehicle changes, a time required for reaching a guide point is reduced. Thus, the navigation system 1 can further increase an amount of information to be transmitted to a driver by changing a movement start position of an acoustic image and a moving amount of the acoustic image based on vehicle speed acquired by the vehicle speed acquiring unit 23.

Figure 4:
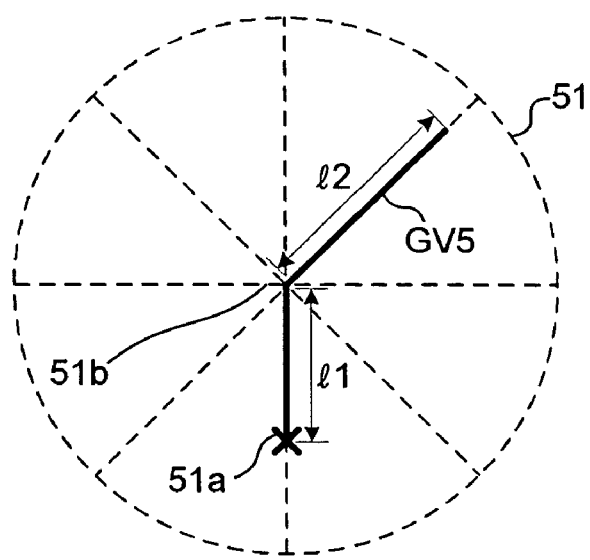
FIG. 4 is an explanatory diagram explaining changes in a movement start position and a moving amount of an acoustic image based on speed of the own vehicle.

The change of a movement start position and a moving amount of an acoustic image based on speed of the own vehicle will be explained with reference to FIG. 4. In the figure, it is assumed that, for the acoustic image GV5, a distance from the movement start position 51a to the direction change position 51b is l1 and a distance from the direction change position 51b to a movement end position of the acoustic image is l2.

When speed of its own vehicle is large, the navigation system 1 can indicate that time until operation for its own vehicle, that is, time required for reaching a guide point is short by moving the movement start position. 51a to the front to reduce the distance l1. In addition, when speed of the own vehicle is large, an amount of operation per time for changing a traveling direction of the own vehicle to a desired direction increases. Thus, when speed of its own vehicle is large, the navigation system 1 can indicate that necessary drive operation is large by increasing the distance l2.

A direction of movement of an acoustic image is not always limited to a horizontal direction. For example, when the own vehicle ascends to an elevated road like an expressway and when the own vehicle descends from the elevated road, a height component is added to a traveling direction of the own vehicle. Thus, the navigation system 1 can realize voice guidance further complying with an actual behavior of its own vehicle by acquiring height information from information on a guide point and changing a height of an acoustic image.

Figure 5:
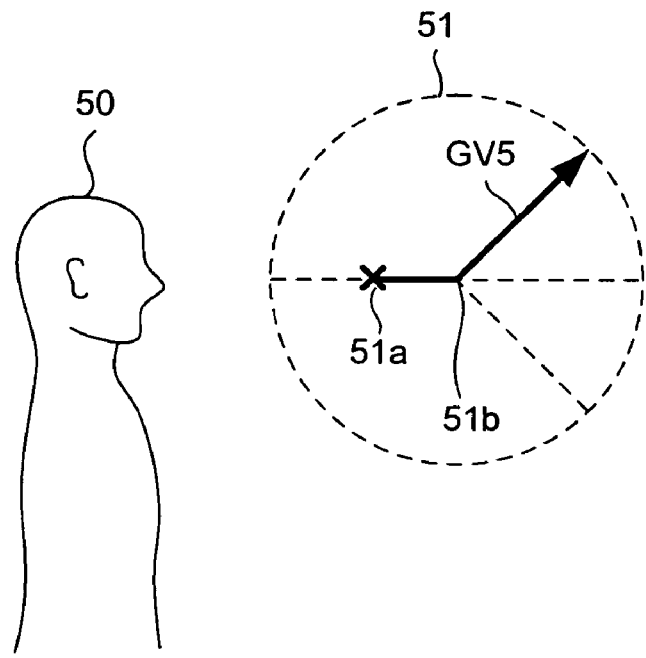
FIG. 5 is an explanatory diagram explaining a change in a height direction of the acoustic image.

FIG. 5 is an explanatory diagram explaining a change in a height direction of an acoustic image. In the figure, first, an acoustic image GV6 created in the acoustic image creation range 51 localizes an acoustic image position to the movement start position 51a to start a voice output and moves the acoustic image position during an output of voice information, and the direction of movement changes to the upward direction from the direction change position 51b. Therefore, the navigation system 1 can further increase an amount of information in a voice output and clearly indicate that its own vehicle ascends to an elevated road. Note that it is needless to mention that it is possible to execute the acoustic image movement in the height direction in combination with acoustic image movement in the horizontal direction.

When direction information of a first guide point indicates a right turn, direction information of a second guide point indicates a left turn, and the first guide point and the second guide point are close to each other, it is desirable that the navigation system 1 creates continuous voices "turn to the right at the next crossing point, turn to the left at a signal ahead of the crossing" and outputs the voices.

Figure 6:
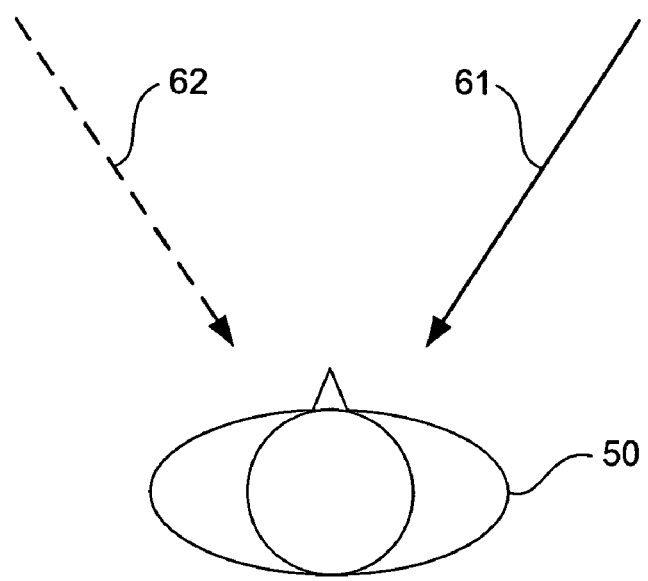
FIG. 6 is an explanatory diagram explaining an output direction in continuous voice outputs.

However, in such continuous voices, when a voice is outputted from respective directions (a right side corresponding to the right turn and a left side corresponding to the left turn) or an acoustic image is moved to the right side once and then moved to the left side, a driver is confused. Thus, in continuous voice outputs, as shown in FIG. 6, the navigation system 1 performs voice outputs corresponding to the first guide point and the second guide point from a direction 61 (right side) corresponding to the first guide point and does not perform a voice output from a direction 62 (left side) corresponding to the second guide point.

In this manner, in the continuous voice outputs, a voice output is performed only from a direction of operation that is required next. In other words, when the navigation system 1 creates an acoustic image in the guide voice control unit 25, the navigation system 1 processes the first guide point and the second guide point as comprehensive time series information rather than treating the first guide point and the second guide point independently and determines a creating position and a direction of movement of the acoustic image. This makes it possible to transmit time series information clearly without confusing the driver.

In a state in which music information is outputted from the audio unit 3, that is, music or the like is outputted from the speakers SP1 to SP4, when voice information is outputted from the navigation unit 2, it is desirable to lower an output of the music information to transmit the voice information for route guidance to a driver more effectively.

However, a rapid change in an output level of the music information gives a sense of incompatibility to the driver and fellow passengers. Thus, when voice information (a guide voice) for route guidance is outputted, the main control unit 41 changes an output (audio output) of music information stepwise to thereby reduce the sense of incompatibility of the driver and the fellow passengers.

Figure 7:
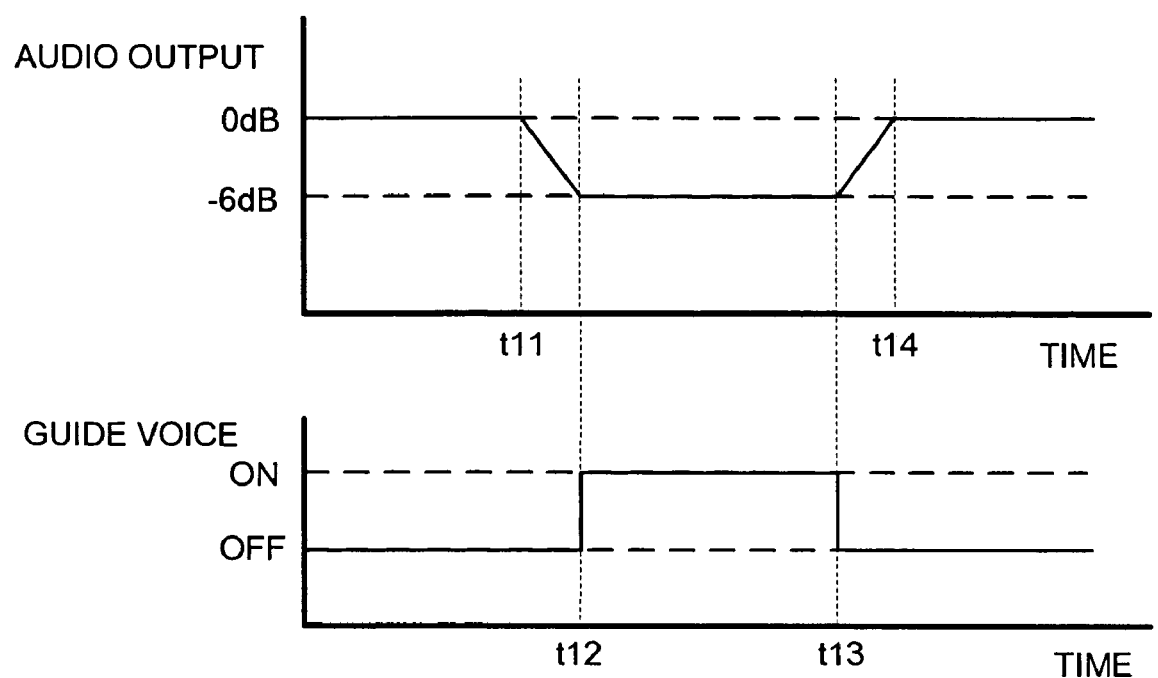
FIG. 7 is an explanatory diagram explaining a guide voice output in a music information output.

FIG. 7 is an explanatory diagram explaining a guide voice output in a music information output. As shown in the figure, in an initial state, music information is outputted at 0 decibel. When an output request for voice information is received from the navigation unit 2 during this audio output, the main control unit 41 reduces the audio output stepwise prior to the output of the voice information.

The main control unit 41 receives an output request for voice information at time t11 and reduces an audio output stepwise from time t11. Thereafter, the main control unit 41 starts the output of the voice information at a point (time t12) when the audio output falls to −6 decibels.

Moreover, after the output of the voice information ends at time t13, that is, route guidance by voice ends, the main control unit 41 recovers the audio output stepwise until the audio output recovers to 0 decibel at time t14.

In this manner, the main control unit 1 can reduce a sense of incompatibility that the driver and the fellow passengers feel by lowering and recovering the audio output stepwise before and after the route guidance by voice.

Incidentally, in FIG. 7, a rate of lowering of the audio output before the start of a voice output and a rate of recovery of the audio output after the end of the voice output are set to be identical. However, for example, when the main control unit 41 performs a voice output with a high degree of emergency like voice guidance near a guide point, the main control unit 41 may perform only recovery of the audio output stepwise or may set the rate of lowering of the audio output large compared with the rate of recovery.

Figure 8:
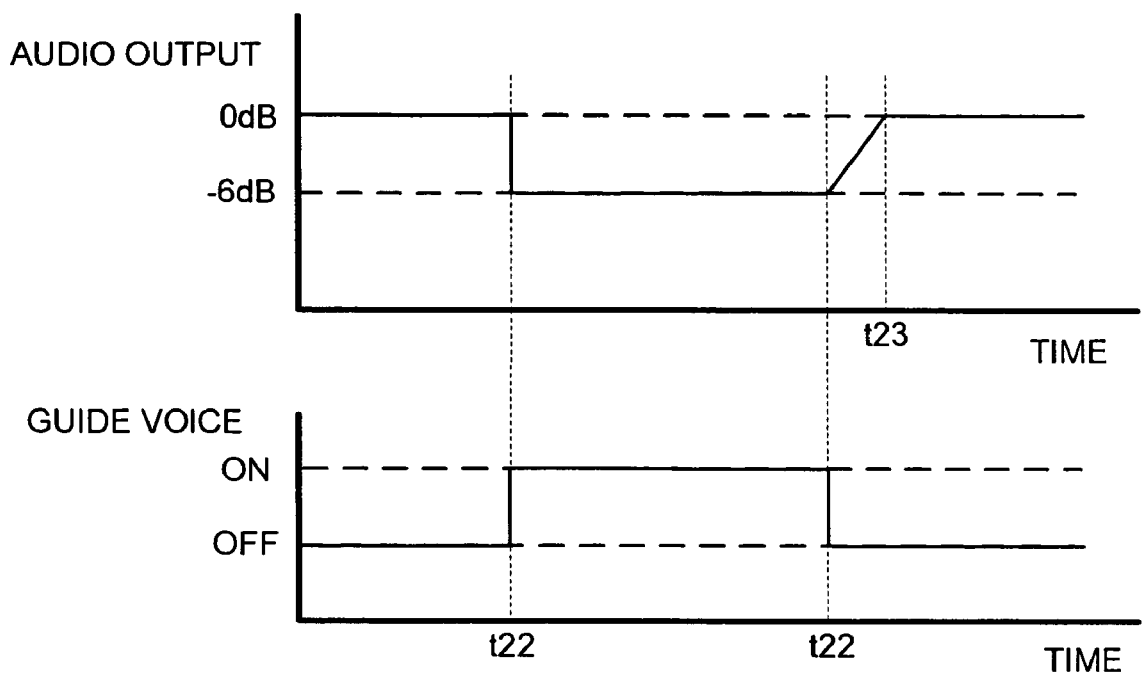
FIG. 8 is an explanatory diagram explaining a case in which only recovery of an audio output is performed stepwise.

FIG. 8 is an explanatory diagram explaining a case in which the main control unit 41 performs only recovery of an audio output stepwise. In the figure, the main control unit 41 receives an output request for voice information at time t21 and lowers the audio output from 0 decibel to −6 decibels at a point of time t21 to start an output of the voice information.

After the output of the voice information ends at time t22, that is, route guidance by voice ends, the main control unit 41 starts stepwise recovery of the audio output and recovers the audio output to 0 decibel at time t23.

Figure 9:
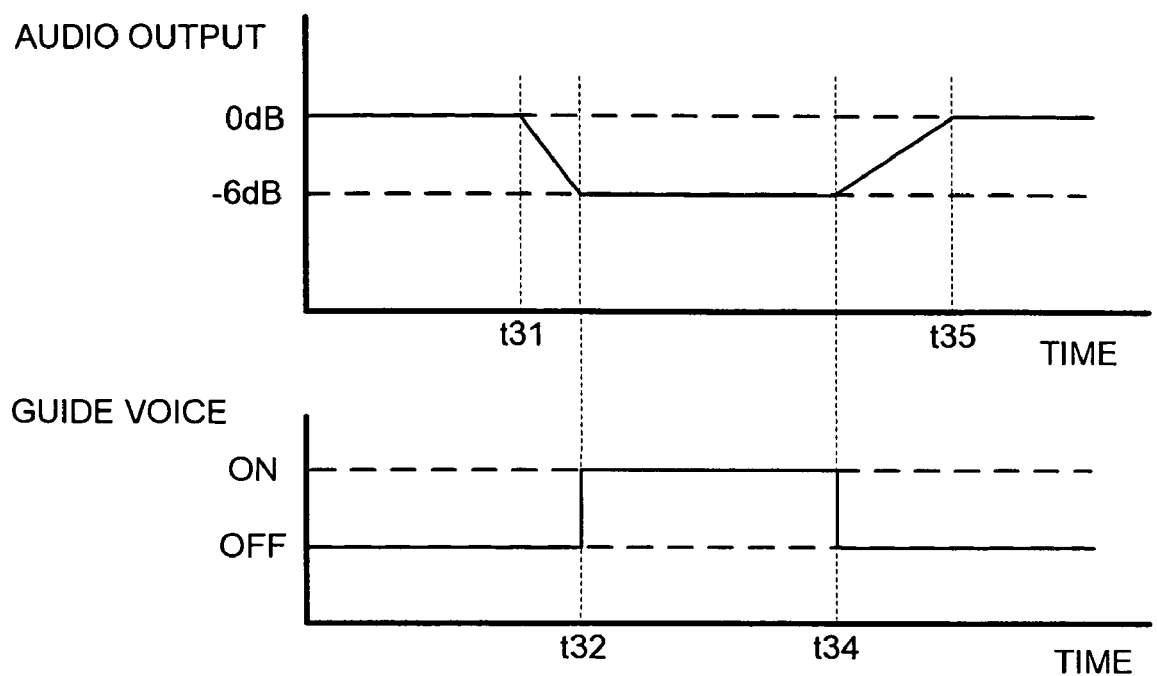
FIG. 9 is an explanatory diagram explaining a case in which a rate of lowering of an audio output is set large compared with a rate of recovery of the same.

FIG. 9 is an explanatory diagram explaining a case in which a rate of lowering of an audio output is set large compared with a rate of recovery of the audio output. In the figure, the main control unit 41 receives an output request for voice information at time t31, lowers the audio output stepwise until time t32 that is a start point of a voice output, and recovers the audio output stepwise from an end point of the voice output (time t34) until time t35.

Here, a rate of lowering of the audio output from time t31 to time t32 is large compared with a rate of recovery of the audio output from time t34 to time t35. Therefore, it is possible to reduce a sense of incompatibility due to a change in an audio output after the end of a voice output while reducing time from a request for a voice output to start of the voice output.

In this manner, it is possible to perform control for an audio output according to an arbitrary system. In addition, this control for an audio output may be changed according to contents of a voice output. For example, it is also possible that the control indicated in FIG. 7 is used when a guide point is at a long distance, the control indicated in FIG. 8 is used when a guide point is at a short distance, and the control indicated in FIG. 9 is used when a guide point is at a medium distance. Similarly, it is possible to use a degree of emergency of contents of a voice output as a selection criterion for a control method for an audio output.

Incidentally, it is not always necessary to fix an output value of a guide voice, and an output level of the guide voice may be changed according to time or the like. For example, an output level at night may be set small compared with an output level in the daytime. It is possible to obtain information on time and position information of the own vehicle from the GPS receiving unit 21.

The communication between the navigation unit 2 and the speaker control unit 4 may be performed using a vehicle-mounted LAN function or may be performed via direct wiring. When the communication between the navigation unit 2 and the speaker control unit 4 is performed via direct wiring, wirings corresponding to a route guidance voice signal, an acoustic image direction designation signal, and an audio output mute signal are formed from the navigation unit 2, respectively.

The route guidance voice signal is a signal indicating a waveform of a voice to be outputted. An analog signal or a digital signal may be used as this signal. The acoustic image direction designation signal is a signal indicating a creating position and contents of movement of an acoustic image. Text data or binary data can be used as the acoustic image direction designation signal. The audio output mute signal is a signal requesting an output of a voice signal for route guidance or a signal requesting lowering of a reproduction output of music information outputted by the audio unit 3 or the like or stop of reproduction of the music information. A binary signal or the like can be used as the audio output mute signal.

Figure 10:
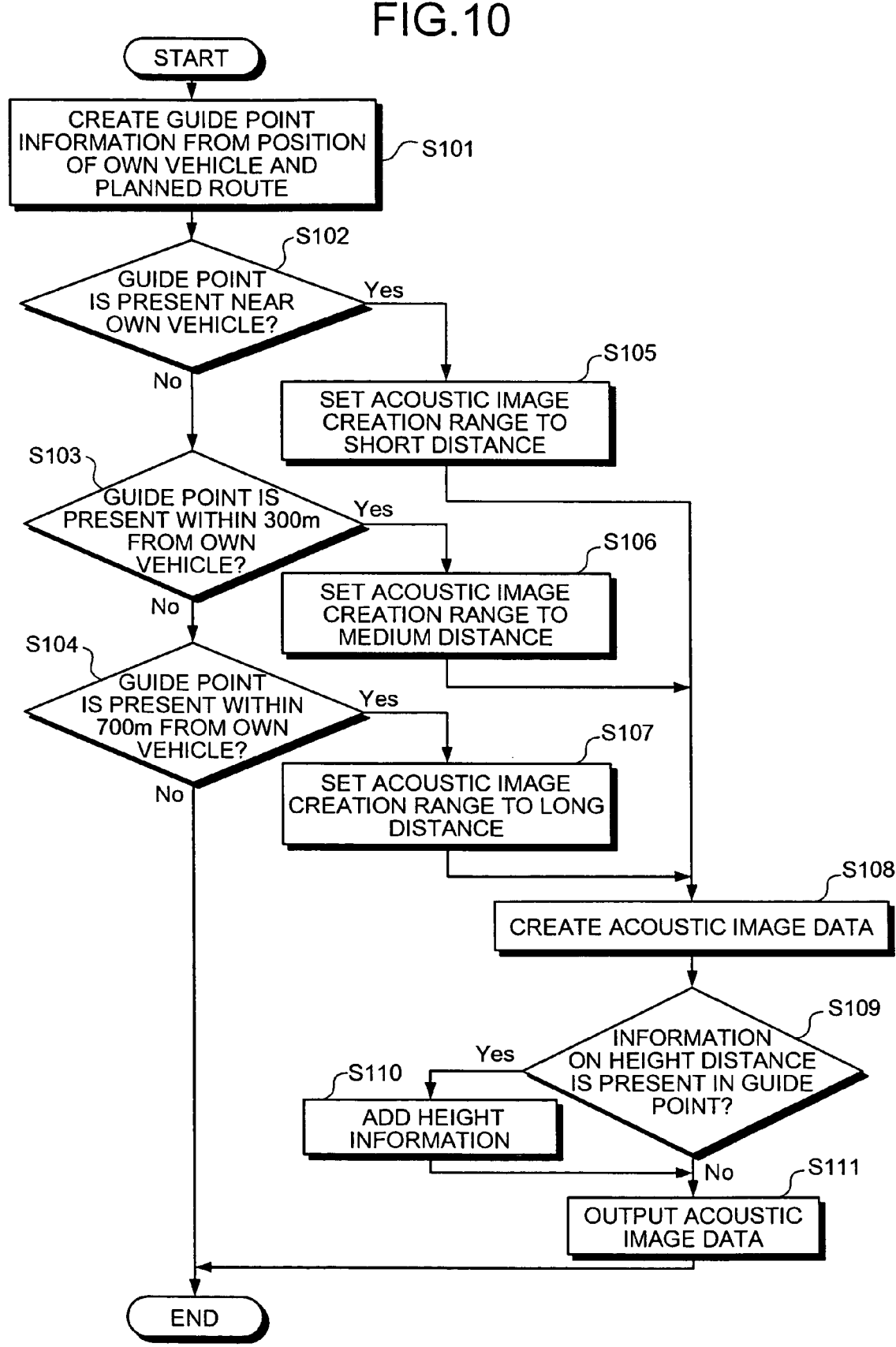
FIG. 10 is a flowchart explaining a processing operation of acoustic image creation.

A processing flow shown in FIG. 10 is executed repeatedly when the navigation unit 2.operates. First, the guide content creating unit 24 creates guide point information from a position and a planned route of its own vehicle (step S101). Next, the guide content creating unit 24 judges whether a guide point is present near its own vehicle (step S102).

If a guide point is present near its own vehicle (Yes at step S102), the guide voice control unit 25 sets an acoustic image creating range to a short distance, that is, selects the acoustic image creation range 51 (step S105). On the other hand, if a guide point is not present near its own vehicle (No at step S102), the guide content creating unit 24 judges whether a guide point is present within 300 meters from its own vehicle (step S103).

If a guide point is present within 300 meters from its own vehicle (Yes at step S103), the guide voice control unit 25 sets an acoustic image creation range to a medium distance, that is, selects the acoustic image creation range 52 (step S106). On the other hand, if a guide point is not present within 300 meters from its own vehicle (No at step S103), the guide content creating unit 24 judges whether a guide point is present within 700 meters from its own vehicle (step S104).

If a guide point is present within 700 meters from its own vehicle (Yes at step S104), the guide voice control unit 25 sets an acoustic image creation range to a long distance, that is, selects the acoustic image creation range 53 (step S107). On the other hand, if a guide point is not present within 700 meters from its own vehicle (No at step S104), the guide content creating unit 24 ends the processing.

After the end of the setting of the acoustic image creation range (steps S105, S106, and S107), the guide voice control unit 25 creates acoustic image data using the first guide point information and the second guide point information (step S108).

Thereafter, the guide voice control unit 25 judges whether height information is present in the first guide point information and the second guide point information (step S109). If height information is present in the first guide point information and the second guide point information, the guide voice control unit 25 adds the height information to the acoustic image data (step S110).

After the end step S110 or if height information is not present in the first guide point information and the second guide point information (No at step S109), the guide voice control unit 25 outputs the acoustic image data to the speaker control unit 22 (step S111) and ends the processing.

Incidentally, it is also possible that a user selects usability of the respective kinds of processing described above, that is, the respective functions of the addition of directionality to voice information using an acoustic image (movement control for an acoustic image), the fixing of an acoustic image to the first guide point at the time of continuous voice information reproduction, the addition of height information to an acoustic image, and the stepwise control of an audio output (linear attenuation).

Figure 11:
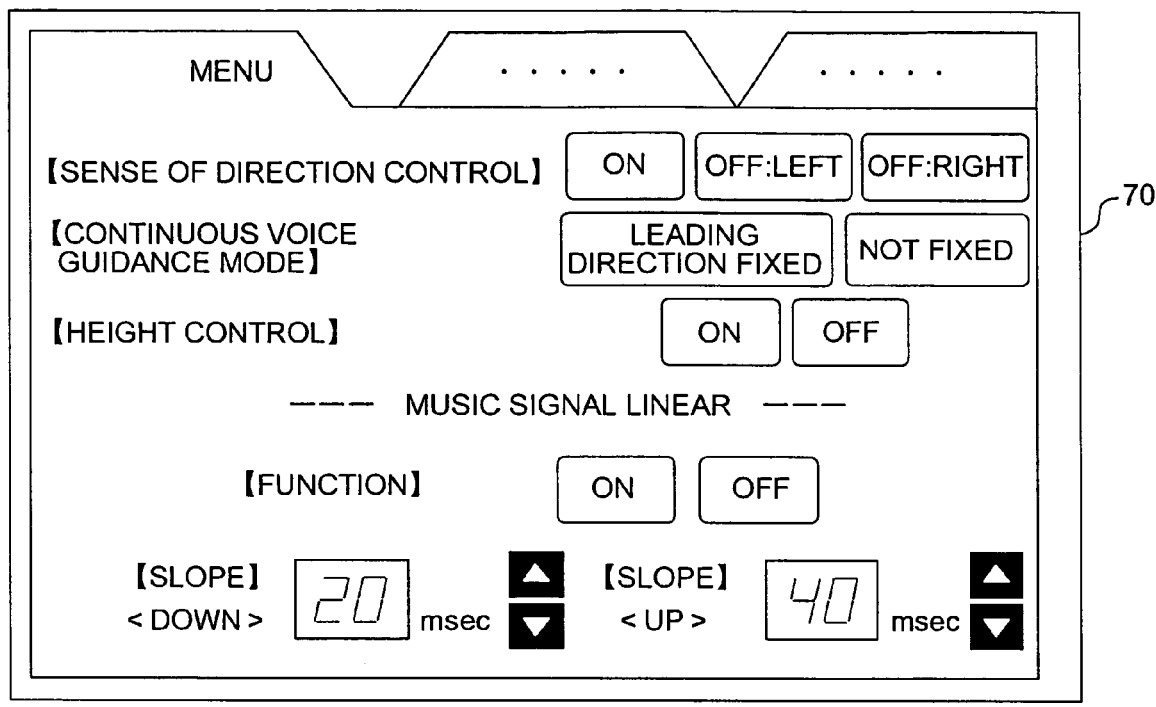
FIG. 11 is an explanatory diagram explaining a specific example of a display screen on which selection of a function is performed.

The navigation system 1 can receive the selection of a function by the user using, for example, a touch panel display. FIG. 11 is an explanatory diagram explaining a specific example of a display screen on which the user performs the selection of a function. On a display screen 70 shown in the figure, for sense of direction control, that is, movement control of an acoustic image, virtual buttons for selecting "ON", "OFF: left", and "OFF: right" are prepared. Here, the button for "OFF: left" is a button for instructing the navigation system 1 to execute a voice output only from a speaker on a left side without performing movement control for an acoustic image. The button for "OFF: right" is a button for instructing the navigation system 1 to execute a voice output only from a right side speaker without performing movement control for an acoustic image.

In addition, for the fixing of an acoustic image to the first guide point in a continuous voice guidance mode, that is, at the time of continuous voice information reproduction, virtual buttons for instructing "leading direction fixed" and "not fixed" are prepared. For the height control of addition of height information to an acoustic image, virtual buttons for instructing "ON" and "OFF" are prepared.

Moreover, for the music signal linear attenuation, that is, the stepwise control for an audio output, virtual buttons instructing "ON" and "OFF" for the function itself, an input space for designating a rate of lowering of an output (slope <DOWN>), and an input space for designating a rate of recovery of an output (slope <UP>) are prepared.

In this manner, for each of the function, a user is allowed to indicate whether the user uses the function and input a setting for operation contents, whereby it is possible to perform output control complying with inclinations of the user.

Figure 12:
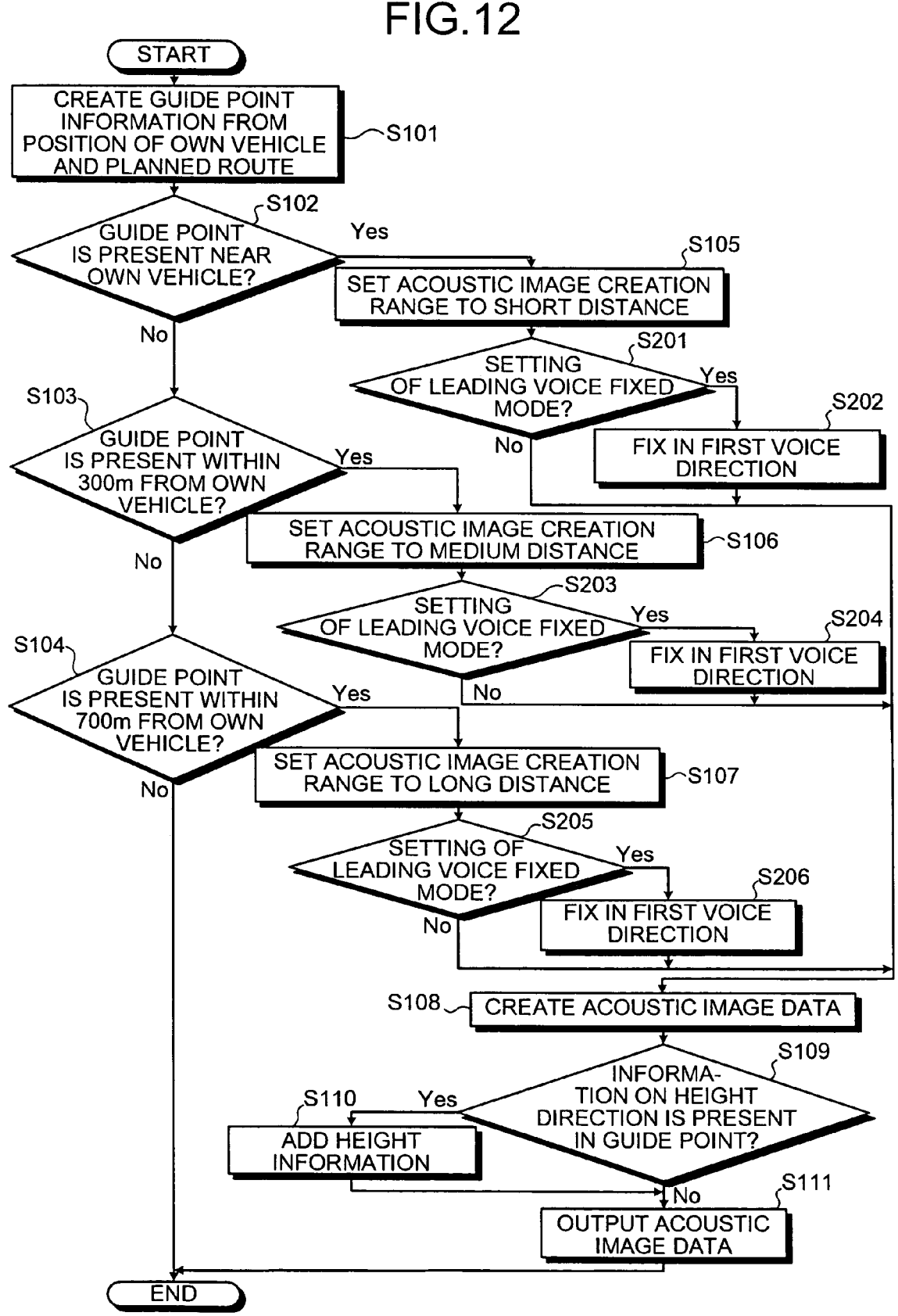
FIG. 12 is a flowchart explaining processing at the time when it is made possible to choose whether a direction of an acoustic image is fixed.

FIG. 12 shows a processing flow at the time when it is made possible to select whether a direction of an acoustic image is to be fixed at the time of continuous voice information reproduction. The processing flow in FIG. 12 is a processing flow in which steps for confirming contents of selection by a user are added to the processing flow shown in FIG. 10. More specifically, steps S201 and S202 are added between steps S105 and S108, steps S203 and S204 are added between steps S106 and S108, and steps S205 and S206 are added between steps S107 and S108.

In the processing flow shown in FIG. 12, after setting the acoustic image creation range to a short distance at step S105, the guide voice control unit 25 confirms contents of setting selected by the user and judges whether the leading direction fixed mode is set (whether the fixing of an acoustic image to the first guide point at the time of continuous voice information reproduction is selected) (step S201).

If the leading direction fixed mode is set, that is, the button of "leading direction fixed" of the continuous voice guidance mode is selected (Yes at step S201), the guide voice control unit 25 fixes a direction of an acoustic image for performing guidance for the first guide point and a direction of an acoustic image for performing guidance for the second guide point to a first voice direction (a direction indicated in the direction information of the first guide point) (step S202). After the end of step S202 or if the leading voice fixed mode is not set, that is, the button of "not fixed" of the continuous voice guidance mode is selected (No at step S201), the guide voice control unit 25 shifts to the creation of acoustic image data (step S108).

Similarly, after setting the acoustic image creation range to a medium distance at step S106, the guide voice control unit 25 judges whether the leading voice fixed mode is set (step S203). As a result, if the leading voice fixed mode is set (Yes at step S203), the guide voice control unit 25 fixes a direction of an acoustic image for performing guidance for the first guide point and a direction of an acoustic image for performing guidance for the second guide point to the first voice direction (step S204). After the end of step S204 or if the leading voice fixed mode is not set (No at step S203), the guide voice control unit 25 shifts to the creation of acoustic image data (step S108).

Moreover, after setting the acoustic image creation range to a long distance at step S107, the guide voice control unit 25 judges whether the leading voice fixed mode is set (step S205). As a result, if the leading voice fixed mode is set (Yes at step S205), the guide voice control unit 25 fixes a direction of an acoustic image for performing guidance for the first guide point and a direction of an acoustic image for performing guidance for the second guide point to the first voice direction (step S206). After the end of step S206 or if the leading voice fixed mode is not set (No at step S205), the guide voice control unit 25 shifts to the creation of acoustic image data (step S108).

Since processing operations of other processing steps are the same as those in the processing flow shown in FIG. 10, an explanation of the processing operations is omitted here.

In the processing flow shown in FIG. 12, when a direction of an acoustic image is determined, contents of setting by a user is confirmed. Thus, it is possible to perform voice guidance with a direction of an acoustic image fixed to the first voice direction if "leading direction fixed" is selected. In addition, it is possible to output voice guidance for the first guide point and voice guidance for the second guide point from different directions, respectively, if "not fixed" is selected.

Concerning the other functions (the addition of directionality to voice information using an acoustic image, the addition of height information to an acoustic image, and the stepwise control for an audio output), it is also possible to set in detail whether the respective functions are used by adding a processing step for confirming contents set by a user.

As described above, in the navigation system 1 according to the first embodiment, an acoustic creation range is set in the front of a driver to provide the user with information on a route direction, information on a distance, and information on a height according to movement of an acoustic image. Thus, it is possible to increase an amount of information in a voice output without imposing a burden on the driver and perform effective route guidance.

In addition, when continuous voice guidance is performed, a voice output is performed with a direction of an output fixed to a direction in which operation is required in advance. Thus, it is possible to transmit time series information clearly without confusing the driver.

Moreover, it is possible to transmit contents of route guidance effectively and surely without giving a sense of incompatibility to a user by lowering and recovering an audio output stepwise before and after route guidance by voice.

Note that the structure indicated According to the first embodiment is an example of implementation of the present invention, and the present invention may be carried out through various modifications. For example, in this embodiment, the navigation unit, the audio unit, and the speaker control unit are constituted independently. However, it is needless to mention that these units may be constituted integrally.

According to the first embodiment, to simplify the explanation, only the first guide point and the second guide point are referred to as examples of a guide point. However, control for guide voice may be performed using a larger number of guide points.

According to the first embodiment, the explanation is made referring to the case in which three acoustic image creation ranges are set as an example. However, it is needless to mention that the number of acoustic image creation ranges may be set to an arbitrary number.

Second Embodiment

According to a second embodiment of the present invention, a navigation apparatus that performs sense of movement control (sense of direction control) for changing moving speed of an acoustic image according to any one of an example sentence structure of voice guidance and an environment in which the voice guidance is listened to or both will be explained. Note that, first, concepts of terms used in the second and a third embodiments will be explained and, then, an outline and characteristics of a navigation system according to the second and the third embodiments will be explained. Thereafter, a structure of the navigation system according to the second embodiment will be explained and, then, procedures of various kinds of processing of this navigation system will be explained.

Concepts of terms used in the second and the third embodiments will be hereinafter explained briefly. "Sense of movement control" used in the second and the third embodiment indicates voice output control for giving a sense of movement (sense of direction) in a guiding direction to contents of voice guidance (navigation voice). "Sense of distance control" indicates voice output control for giving a sense of distance to a point where a guidance instruction (e.g., an instruction for vehicle operation like right and left turns and change of direction) should be executed (e.g., a guide point like a crossing, a traffic signal, or a junction point of roads) to contents of voice guidance (navigation voice).

The "Guide point" used in the second and the third embodiments indicates a point where the navigation system should provide voice guidance with a driver based on planned route information, current position information and map information of its own vehicle. More specifically, "guide point" indicates a point where a guidance instruction (e.g., an instruction for right and left turns and change of direction) should be executed (e.g., a guide point like a crossing or a junction point of roads).

In addition, distinguished from the guide point, "voice guidance output point" used in the second and the third embodiments indicates a point that is most suitable in outputting voice guidance. For example, in the second and the third embodiments, it is assumed that a planned route point near a "guide point" is a voice guidance output point at a short distance, a planned route point within 300 meters from the point near the "guide point" is a voice guidance output point at a medium distance, and a planned route point within 700 meters from the point of 300 meter from the "guide point" is a voice guidance output point at a long distance.

Figure 13:
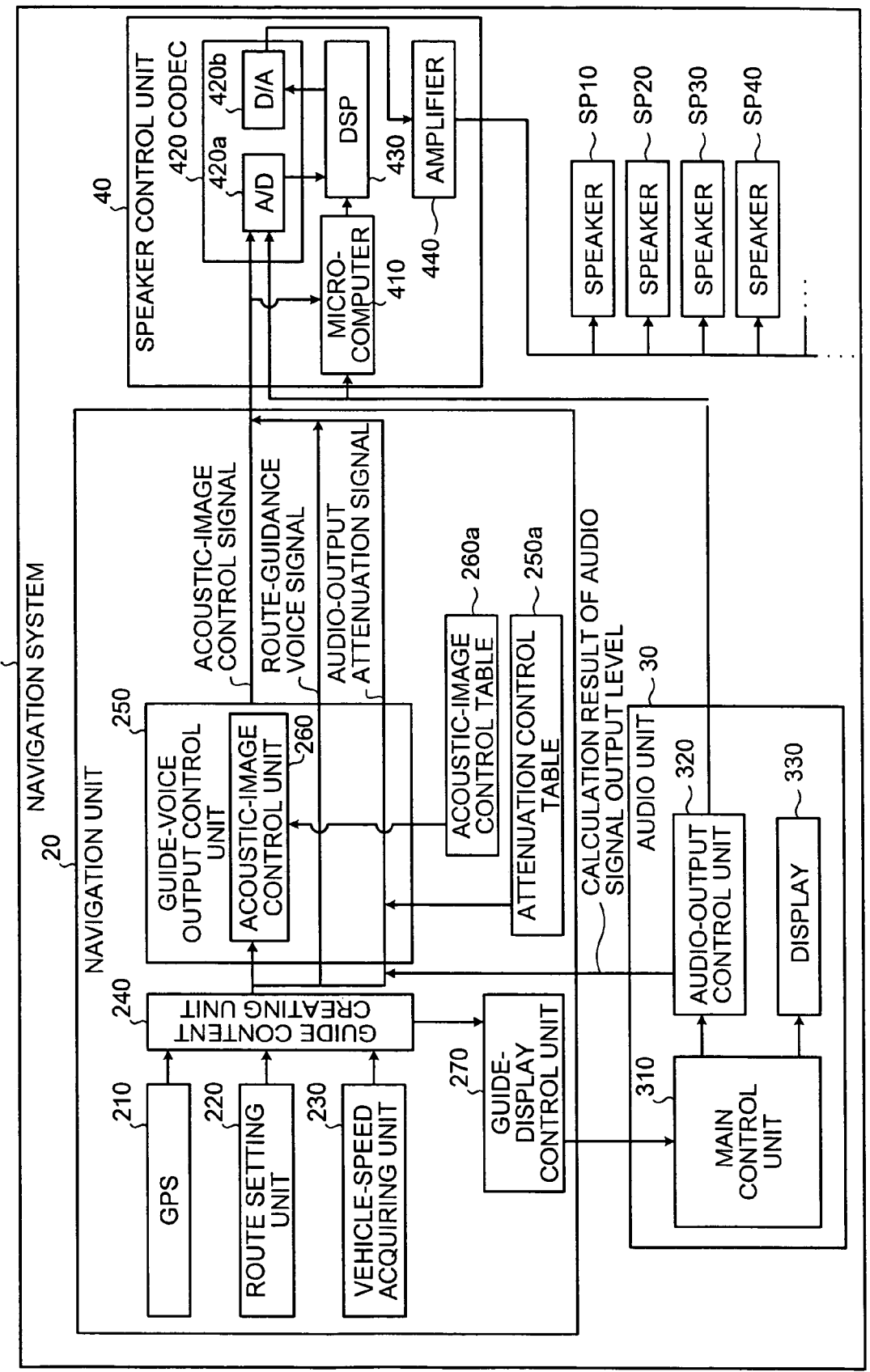
FIG. 13 is a schematic diagram of a schematic structure of a navigation system according to a second embodiment of the present invention.

FIG. 13 is a schematic diagram of a schematic structure of a navigation system 10 according to the second embodiment. As shown in the figure, this navigation system 10 performs route guidance based on preset route information and current position information.

Here, the navigation system 10 according to the second and the third embodiments has a main characteristic in acoustic image control processing for changing moving speed of an acoustic image according to any one of an example sentence structure of voice guidance and an environment in which the voice guidance is listened to or both.

With such "acoustic image control processing", the navigation system 10 makes it possible to transmit a sense of movement in a guiding direction to a driver clearly to perform effective route guidance.

To explain this main characteristic more specifically, this navigation system 10 changes moving speed of an acoustic image of voice guidance according to any one of an example sentence structure of the voice guidance (e.g., an example sentence structure like a length of an example sentence of the voice guidance or a section of a break of the voice guidance) and an environment in which the voice guidance is listened to (e.g., an environment in which the acoustic image of the voice guidance is controlled to move in the rear direction or a direction of a driver seat or an environment like speed information of its own vehicle) or both.

Consequently, it is possible to move an acoustic image at appropriate moving speed according to an example sentence structure of voice guidance, which is about to be outputted by voice, and an environment in which the voice guidance is listened to and transmit a sense of movement in a guiding direction to a driver clearly.

Therefore, when this is applied to the example of the conventional technologies described above, rather than moving an acoustic image of voice guidance uniformly to thereby give a driver a sense of movement that causes the driver to miss the voice guidance or misunderstand the voice guidance, moving speed of the acoustic image is changed according to any one of an example sentence structure of the voice guidance and an environment in which the voice guidance is listened to or both. Thus, it is possible to transmit a sense of movement in a guiding direction to the driver clearly and to perform effective route guidance as in the main characteristic described above.

FIG. 13 is a schematic diagram of a schematic structure of the navigation system 10 according to the second embodiment. As shown in the figure, this navigation system 10 includes a navigation unit 20, an audio unit 30, a speaker control unit 40, and speakers SP10 to SP40.

The navigation unit 20 includes a GPS receiving unit 210, a route setting unit 220, a vehicle speed acquiring unit 230, a guide content creating unit 240, a guide voice-output control unit 250, an attenuation control table 250a, an acoustic-image control unit 260, an acoustic image control table 260a, and a guide display control unit 270. Here, the GPS receiving unit 210, the route setting unit 220, the vehicle speed acquiring unit 230, the guide content creating unit 240, the guide voice-output control unit 250, the acoustic-image control unit 260, and the guide display control unit 270 may be constituted by microcomputers or the like or may be constituted by electronic circuits. The units are divided according to functions. In a physical structure, all or a part of the units may be integrated or distributed.

The GPS receiving unit 210 receives information from a GPS satellite to acquire time information and specifies position information of its own vehicle. In addition, the GPS receiving unit 210 outputs the specified position of its own vehicle to the guide content creating unit 240.

The route setting unit 220 is a processing unit that sets and stores a planned route of its own vehicle in response to user input from a user (e.g., a driver). The route setting unit 220 outputs a set route and map information to the guide content creating unit 240.

The vehicle speed acquiring unit 230 acquires vehicle speed information of its own vehicle and outputs the vehicle speed information to the guide content creating unit 240. Note that the vehicle speed acquiring unit 230 may acquire the vehicle information from a speedometer of its own vehicle or may calculate the vehicle speed information from transition of the position information specified by the GPS receiving unit 210. For example, the vehicle speed acquiring unit 230 may estimate a vehicle speed to some extent according to whether its own vehicle is running on a general road or running on an expressway. Alternatively, the vehicle speed acquiring unit 230 may acquire legal speed information in association with the route setting unit 220 and regard this legal speed as vehicle speed information of its own vehicle.

The guide content creating unit 240 is a processing unit that creates contents to be notified to a driver of its own vehicle based on outputs of the GPS receiving unit 210 and the route setting unit 220. More specifically, as information on a location where voice guidance should be provided to the driver (i.e., guide point information), the guide content creating unit 240 stores distance information indicating a distance from a current position of its own vehicle to the location (guide point) and direction information indicating a direction that its own vehicle should take in the location.

Here, a guide point indicates a location where the navigation system 10 judges voice guidance should be provided to a driver based on planned route information, current position information, and map information of its own vehicle. For example, when its own vehicle turns to the right at a crossing 300 meters ahead from the current position, the guide point is the crossing 300 meters ahead. Note that, since such a judgment method, that is, a method of judgment on "in which location voice guidance should be outputted" is the same as that in the conventional technologies, an explanation of the judgment method is omitted here.

The guide content creating unit 240 determines contents of route guidance based on the created guide point information. Among the contents of the route guidance, the guide content creating unit 240 outputs contents, which are outputted by voice, (voice guidance) to the guide voice-output control unit 250 and outputs contents, which are displayed on a display 330, to the guide display control unit 270.

The guide voice-output control unit 250 determines from which direction voice guidance is outputted to a driver based on the output of the guide content creating unit 240 and transmits the determination to the speaker control unit 40. The guide display control unit 270 transmits contents to be displayed on a display to the audio unit 30 based on the output of the guide content creating unit 240.

Note that "sense of movement and sense of distance control" (i.e., acoustic image localization control) in the guide voice-output control unit 250 and the acoustic-image control unit 260 and "voice output control" for plural output voices (e.g., voice guidance and an audio output) for performing such "sense of movement and sense of distance control" more effectively as well as an attenuation control table 250a and an acoustic image control table 260a related to the control will be explained in detail after structures of the respective units are explained.

The audio unit 30 includes a main control unit 310, an audio output control unit 320, and a display 330. Here, the main control unit 310 and the audio output control unit 320 may be constituted by microcomputers or the like or may be constituted by electronic circuits. These units are divided according to functions. In a physical structure, both the units may be integrated.

The main control unit 310 is a control unit that controls the entire audio unit 30. For example, if the audio unit 30 is a DVD player, the main control unit 310 reads out music information and the like stored in a DVD disk and outputs the music information and the like to the audio output control unit 320 and also reads out video information and the like and displays the video information and the like on the display 330. The audio output control unit 320 transmits the music information outputted by the main control unit 310 to the speaker control unit 40. Note that this audio unit 30 is not limited to the DVD player and may be an audio unit having functions of a compact disk, a hard disk, a radio, a television, and the like.

In addition, the display 330 is also used for image display for route guidance by the navigation unit 20. Thus, in the navigation unit 20, the main control unit 310 has a function of causing the display 330 to display contents received from the guide display control unit 270. In other words, the main control unit 310 reads out information from various media and outputs the information and, at the same time, performs integrated management for the display 330.

The audio output control unit 320 includes an output level calculating unit (not shown) that calculates an actual output level of an audio signal inputted from the main control unit 310. Note that it is possible to realize such an output level calculating function easily by installing an integration circuit or the like.

An output level calculation result of the audio signal in the output level calculating unit is transmitted to the guide voice-output control unit 250. In other words, this output level calculating unit transmits an actual volume level of music to be reproduced to the guide voice-output control unit 250 such that it is possible to determine an attenuation (ATT) amount of the music to be reproduced according to the actual volume level of the music to be reproduced.

The speaker control unit 40 includes a microcomputer 410, a code 420, a digital signal processor (DSP) 430, and an amplifier 440. The microcomputer 410, the code 420, and the DSP 430 may be constituted by microcomputers or the like or may be constituted by electronic circuits. These units are divided according to functions. In a physical structure, the units may be integrated.

The code 420 converts a "route guidance voice signal" received from the guide voice-output control unit 250 in the navigation unit 20 by an A/D unit 420a in the code 420 and an "audio output signal" received from the audio output control unit 320 in the audio unit 30 into digital signals and outputs the digital signals to the DSP 430 as sound data.

The microcomputer 410 is a control unit that controls the entire speaker control unit 40. More specifically, the microcomputer 410 integrally controls a "route guidance voice signal" from the navigation unit 20 and an "audio output signal" from the audio unit 30 and controls from which speaker and with what degree of power voice reproduction and music reproduction should be performed. For example, when the microcomputer 410 receives an "acoustic image control signal" involving an "audio output attenuation signal" from the navigation unit 20, the microcomputer 410 instructs the DSP 430 to apply attenuation processing to the "audio output signal" and, at the same time, instructs the DSP 430 to apply digital signal processing according to the "sense of movement control" and the "sense of distance control" to the "route guidance voice signal".

The DSP 430 applies digital signal processing according to the "sense of movement control" or the "sense of distance control" to the output of the A/D unit 420a (i.e., the "route guidance voice signal") based on the output of the microcomputer 410 (i.e., the "acoustic image control signal") and outputs the outputs to a DA converter unit (D/A unit) 420b in the code 420. An output of the D/A unit 420b is subjected to intensity control by the amplifier 440 and reproduced as voice guidance or music from the speakers SP10 to SP40.

The speakers SP10 to SP40 are arranged as, for example, a right front speaker, a left front speaker, a right rear speaker, and a left rear speaker in a vehicle room. By controlling output intensities of these respective speakers, the speakers can output a voice such that a driver can hear the voice from a desired direction and a desired distance. The voice, which is outputted such that the driver can hear from a virtual position in this manner, will be hereinafter represented as an "acoustic image", and the virtual position of the acoustic image is represented as an "acoustic image position".

Here, basic control in the guide voice-output control unit 250 and the acoustic-image control unit 260, that is, an outline of control until voice guidance is outputted will be explained. First, the guide content creating unit 240 creates guide point information from a position and a planned route of its own vehicle. The guide voice-output control unit 250 generates a "route guidance voice signal" indicating a waveform of voice guidance based on the guide point information created by the guide content creating unit 240.

To explain this more specifically, the guide voice-output control unit 250 creates voice guidance based on information on a distance from a current position of its own vehicle to the location (guide point) and "guide point information" including guiding direction information indicating a direction that its own vehicle should take in the location. For example, the guide voice-output control unit 250 creates voice guidance 910 "to the right ahead", voice guidance 920 "to the right at a crossing ahead", and voice guidance 930 "to the right at the first traffic signal ahead".

The acoustic-image control unit 260 generates an "acoustic image control signal" indicating a creating position and contents of movement of an acoustic image of voice guidance based on the guide point information created by the guide content creating unit 240. Note that a specific explanation of the generation of this "acoustic image control signal" will be provided later.

The guide voice-output control unit 250 generates an "audio output attenuation signal" based on an output level calculation result of the audio signal received from the audio output control unit 320. Note that a specific explanation of the generation of this "audio output attenuation signal" will also be provided later.

The guide voice-output control unit 250 transmits the "audio output attenuation signal" to the speaker control unit 40. The microcomputer 410 in the speaker control unit 40, which has received this "audio output attenuation signal", attenuates an audio output based on an ATT amount instructed by the received signal.

Subsequently, the guide voice-output control unit 250 and the acoustic-image control unit 260 transmit the "route guidance voice signal" and the "acoustic image control signal" to the speaker control unit 40, respectively. The microcomputer 410 in the speaker control unit 40 adjusts output intensities in the speakers SP10 to SP40 and outputs voice guidance based on the "route guidance voice signal" and the "acoustic image control signal".

In this manner, voice output control including sense of movement control (acoustic image localization control) for voice guidance is performed based on the "route guidance voice signal" and the "acoustic image control signal", and attenuation control for an audio output is performed based on the "audio output attenuation signal".

Figure 14:
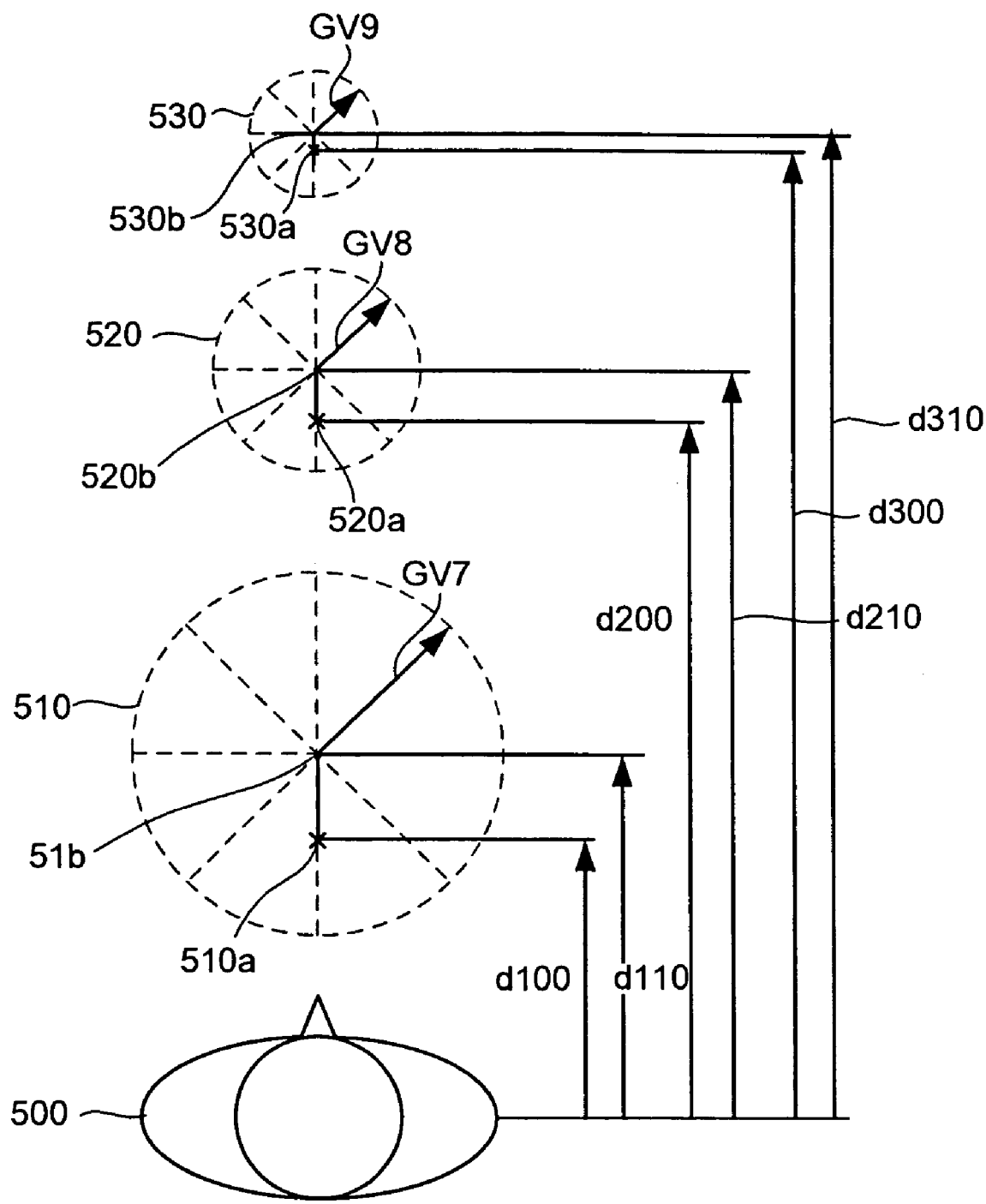
FIG. 14 is an explanatory diagram explaining a specific example of acoustic image localization control.

FIG. 14 is an explanatory diagram explaining a specific example of the acoustic image localization control. In the figure, three acoustic image creation ranges 510, 520, and 530 are set for a driver 500. The navigation system 10 uses the acoustic image creation range 510 when the navigation system 10 guides vehicle operation near a current position of its own vehicle. The navigation system 10 uses the acoustic image creation range 520 when the navigation system 10 guides vehicle operation in a medium distance, for example, 300 meters ahead of the current position of its own vehicle. The navigation system 10 uses the acoustic image creation range 530 when the navigation system 10 guides vehicle operation in a long distance, for example, 700 meters ahead of the current position of its own vehicle.

The acoustic image creation range 510 includes a movement start position 510a and a direction change position 510b. In localizing an acoustic image in the acoustic image creation range 510, first, the navigation system 10 localizes an acoustic image in the movement start position 510a and moves an acoustic image position together with a voice output. Thereafter, the navigation system 10 changes a direction of movement of the acoustic image from the direction change position 510b to thereby indicate which direction its own vehicle should proceeds according to a direction of movement of the acoustic image.

In the acoustic image creation range 510, the navigation system 10 copes with eight directions, namely, "front", "right front", "left front", "right direction", "left direction", "right rear", "left rear", and "rear" as direction of movements of an acoustic image. For example, when the navigation system 10 notifies a driver that a course should be changed to "right front" at the next crossing, the navigation system 10 creates voice information "to right front at the next crossing", localizes an acoustic image position in the movement start position 510a as indicated by an acoustic image GV7 to start a voice output and moves the acoustic image position during an output of voice information to change a direction of movement to the right front from the direction change position 510b.

Similarly, the acoustic image creation range 520 includes a movement start position 520a and a direction change position 520b. In localizing an acoustic image, first, the navigation system 10 localizes an acoustic image in the movement start position 520a to move an acoustic image position together with a voice output and changes a direction of movement of the acoustic image from the direction change position 520b. In the acoustic image creation range 520, the navigation system 10 also copes with the eight directions, namely, "front", "right front", "left front", "right direction", "left direction", "right rear", "left rear", and "rear" as direction of movements of an acoustic image.

The acoustic image creation range 530 includes a movement start position 530a and a direction change position 530b. In localizing an acoustic image, first, the navigation system 10 localizes an acoustic image in the movement start position 530a to move an acoustic image position together with a voice output and changes a direction of movement of the acoustic image from the direction change position 530b. In addition, in the acoustic image creation range 530, the navigation system 10 also copes with the eight directions, namely, "front", "right front", "left front", "right direction", "left direction", "right rear", "left rear", and "rear" as direction of movements of an acoustic image. Note that the acoustic image creation range 530 may be a point that is fixed with respect to the driver 500. In that case, the voice output from this acoustic image creation range 530 does not involve movement of an acoustic image.

The acoustic image creation range 510 is set large compared with the acoustic image creation range 520. In addition, a distance d200 from the driver 500 to the movement start position 520a of the acoustic image creation range 520 and a distance d210 from the driver 500 to the direction change position 520b are set large compared with a distance d100 from the driver 500 to the movement start position 510a of the acoustic image creation range 510 and a distance d110 from the driver 500 to the direction change position 510b, respectively. Similarly, the acoustic image creation range 520 is set large compared with the acoustic image creation range 530. A distance d300 from the driver 500 to the movement start position 530a of the acoustic image creation range 530 and a distance d310 from the driver 500 to the direction change position 530b are set large compared with a distance d200 from the driver 500 to the movement start position 520a of the acoustic image creation range 520 and a distance d210 from the driver 500 to the direction change position 520b, respectively.

Therefore, when the navigation system 10 guides vehicle operation near its own vehicle, a voice of the navigation system 10 is heard near the driver 500, and a moving amount of an acoustic image increases. When the navigation system 10 guides vehicle operation at the medium distance, voice of the navigation system 10 is heard at a medium distance from the driver 500, and a moving amount of an acoustic image decreases. When the navigation system 10 guides vehicle operation at the long distance, voice of the navigation system 10 is heard from a distance, and a moving amount of an acoustic image further decreases or the acoustic image does not move.

Consequently, the driver 500 can recognize information on a route, to which the driver 500 is guided, according to not only contents of a voice but also movement of the acoustic image. Even if a guide voice is for guidance to "right rear", "left rear", or "rear", after moving to the front from the movement start positions 510a and 520a, an acoustic position proceeds straight to the direction change positions 510b and 520b and then changes a direction to the rear. Thus, the navigation system 10 can guide vehicle operation in a direction complying with an actual behavior of its own vehicle and can output voice from the front of the driver 500. Consequently, the navigation system 10 can increase an amount of information in a voice output without imposing a burden on the driver 500 and perform effective route guidance.

Here, the navigation system 10 according to the second embodiment is characterized by performing, in addition to the "sense of movement control" described above, "sense of movement control" (acoustic image localization control) for changing moving speed of an acoustic image according to an example sentence structure of voice guidance and an environment in which the voice guidance is listened to. Such a characteristic will be hereinafter explained in detail.

The acoustic image control table 260a is a table storing acoustic image creation conditions for performing the "sense of movement control" according to an example sentence structure of a voice guidance and an environment in which the voice guidance is listened to. For example, the acoustic image control table 260a stores a "length" of the example sentence of the voice guidance and moving speed of an acoustic image corresponding to the "length" in association with each other.

To explain this more specifically, as shown in FIG. 15A, the acoustic image control table 260a stores moving speed of an acoustic image "A (m/s)", moving speed of an acoustic image "B (m/s)", and moving speed of an acoustic image "C (m/s)" in association with a length of an example sentence of voice guidance "long" (20 characters or more), a length of an example sentence of voice guidance "medium" (15 characters or more and less than 20 characters), and a length of an example sentence of voice guidance "short" (less than 15 characters), respectively. Note that, According to the second embodiment, to make time when movement of an acoustic image converges and time when a voice output ends identical, a relation of sizes of such parameters A, B, and C is set as "A>B>C" such that moving speed of the acoustic image becomes higher as the length of an example sentence of voice guidance increases.

In addition, the acoustic image control table 260a stores a "guiding direction" and a gain of an acoustic image corresponding to the "guiding direction" with respect to moving speed in association with each other. More specifically, as shown in FIG. 15B, the acoustic image control table 260a stores a gain of an acoustic image with respect to moving speed "−D (m/s)" and a gain of an acoustic image with respect to moving speed "−E (m/s)" in association with a guiding direction "rear" and a guiding direction "driver direction" (e.g., right), respectively.

Moreover, the acoustic image control table 260a stores "speed" of its own vehicle and a moving amount (moving angle) of an acoustic image corresponding to the "speed" in association with each other. More specifically, as shown in FIG. 15C, the acoustic image control table 260a stores a moving amount of an acoustic image "small" (i.e., setting for reducing a moving angle), a moving amount of an acoustic image "medium" (i.e., setting for making moving angle normal), and a moving amount of an acoustic image "large" (i.e., setting for increasing a moving angle) in association with speed of the own vehicle "high speed" (80 km/h or more), speed of its own vehicle "medium speed" (40 km/h or more and less than 80 km/h), and speed of the own vehicle "low speed" (less than 40 km/h), respectively.

Here, the acoustic-image control unit 260 generates an "acoustic image control signal" indicating a creating position and contents of movement of an acoustic image of voice guidance based on the "speed information" of its own vehicle acquired by the vehicle speed acquiring unit 230, the "guide point information" created by the guide content creating unit 240, and the "acoustic image creation conditions" stored in the acoustic image control table 260a.

The generation of such an "acoustic image control signal" will be explained specifically. First, when its own vehicle approaches a voice guidance output point, the acoustic-image control unit 260 sets an acoustic image creation range corresponding to the voice guidance output point. For example, when its own vehicle approaches a voice guidance output point at a short distance, the acoustic-image control unit 260 sets an acoustic image creation range to a short distance, that is, sets the acoustic image creation range 510. When its own vehicle approaches a voice guidance output point at a medium distance, the acoustic-image control unit 260 sets an acoustic image creation range to a medium distance, that is, sets the acoustic image creation range 520. In addition, when its own vehicle approaches a voice guidance output point at a long distance, the acoustic-image control unit 260 sets an acoustic image creation range to a long distance, that is, sets the acoustic image creation range 530.

Then, the acoustic-image control unit 260 sets moving speed of an acoustic image corresponding to a length of an example sentence of voice guidance with reference to the acoustic image control table 260a. More specifically, when a length of an example sentence of voice guidance is "long" (e.g., when voice guidance, which is about to be outputted by voice, is voice guidance 930 "to the right at the first signal ahead" (twenty-one characters), the acoustic-image control unit 260 sets a moving speed of an acoustic image to "high speed". In this manner, moving speed of an acoustic image is set high when an example sentence of voice guidance is long, whereby it is possible to prevent a situation in which a sense of incompatibility is caused in that, although movement of the acoustic image converges, the voice guidance continues to be outputted.

On the other hand, when a length of an example sentence of voice guidance is "medium" (e.g., voice guidance, which is about to be outputted by voice, is voice guidance 920 "to the right at a crossing ahead" (eighteen characters), the acoustic-image control unit 260 sets moving speed of an acoustic image to "medium speed".

In addition, when a length of an example sentence of voice guidance is "short" (e.g., voice guidance, which is about to be outputted, is voice guidance 910 "to the right ahead" (twelve characters), the acoustic-image control unit 260 sets moving speed of an acoustic image to "low speed". In this manner, moving speed of an acoustic image is set low when an example sentence of voice guidance is long, whereby it is possible to prevent a situation in which a voice output of voice guidance ends before movement of the acoustic image converges.

In other words, moving speed of an acoustic image is changed according to a length of an example sentence of voice guidance, whereby timing for converging the acoustic image of the voice guidance in a guiding direction and timing for ending a voice-output of the voice guidance are made identical such that it is possible to transmit a sense of movement in the guiding direction to a driver more clearly.

Moreover, the acoustic-image control unit 260 resets moving speed of an acoustic image to moving speed of the acoustic image corresponding to a direction in which the navigation system 10 should guide the driver. More specifically, when a guiding direction is the rear with respect to the driver, the acoustic-image control unit 260 performs resetting for lowering moving speed of an acoustic image in the present setting (e.g., the moving speed is assumed as "A (m/s)") by a gain of the moving speed "D (m/s)" in the acoustic image control table 260a (i.e., resetting for obtaining moving speed of the acoustic image of "A-D (m/s)". Note that "the rear" in this case may be only a right rear direction or may be a rear direction including other direction components (i.e., the left rear or the right rear).

Similarly, when a guiding direction is a direction of a driver seat, the acoustic-image control unit 260 performs resetting for lowering moving speed of an acoustic image in the present setting (e.g., the moving speed is assumed to be "A (m/s)" by a gain of the moving speed "E (m/s)" in the acoustic image control table 260a (i.e., resetting for obtaining moving speed of the acoustic image of "A-E (m/s)". Note that, when a guiding direction is neither the rear direction nor the direction of a driver seat, the acoustic-image control unit 260 maintains the moving speed of the acoustic image in the present setting. Note that the "direction of a driver seat" in this case may be only a direction of a driver seat or may be a direction of a driver seat including other direction components (i.e., when the deriver's seat is present in the "right direction", the right front or the right rear).

In this manner, when a guiding direction is the rear with respect to the driver, an acoustic image is moved at low speed compared with speed at the time when the acoustic image is moved in other directions, whereby it is possible to transmit a sense of movement in the guiding direction to the driver smoothly.

In addition, when a guiding direction is a direction of a driver seat, an acoustic image is moved at low speed compared with speed at the time when the acoustic image is moved in a direction of a passenger seat, whereby it is possible to transmit a sense of movement in the guiding direction to the driver smoothly.

Moreover, the acoustic-image control unit 260 sets a moving amount (moving angle) of an acoustic image corresponding to speed of its own vehicle with reference to the acoustic image control table 260a. More specifically, when speed of its own vehicle is "high speed" (80 km/h or more), the acoustic-image control unit 260 sets a moving amount of an acoustic image to "small". When speed of its own vehicle is "medium speed" (40 km/h or more and less than 80 km/h), the acoustic-image control unit 260 sets a moving amount of an acoustic image to "medium". When speed of its own vehicle is "low speed" (less than 40 km/h), the acoustic-image control unit 260 sets a moving amount of an acoustic image to "large".

Figures 16, 17:
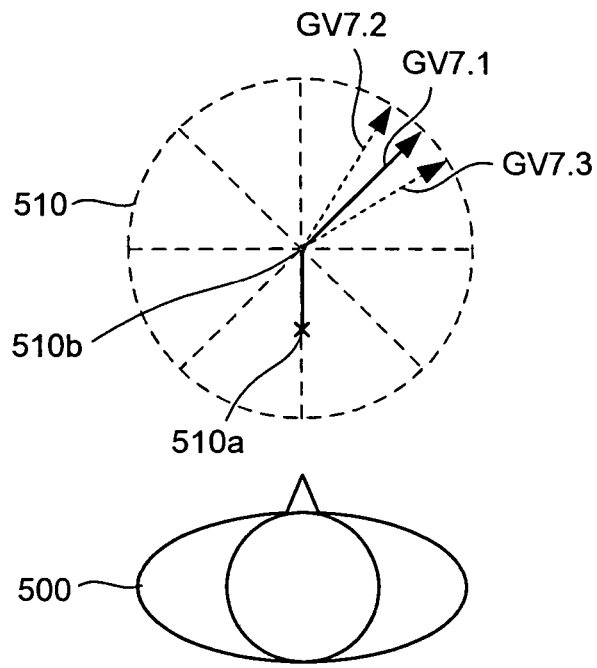
FIG. 16 is an explanatory diagram for explaining a change in a moving amount.
FIG. 17 is a diagram of an example of a structure of information stored in an attenuation control table.

FIG. 16 is an explanatory diagram for explaining a change in a moving amount (moving angle). In this embodiment, a change in a moving amount at the time when a guiding direction is the "right front" and an acoustic image creation range is set to the acoustic image creation range 510 is explained.

As shown in the figure, when a moving amount (moving angle) of an acoustic image is set to "small", the acoustic-image control unit 260 selects an acoustic image GV7 with a narrowed moving angle. When a moving amount (moving angle) of an acoustic image is set to "medium", the acoustic-image control unit 260 selects a normal acoustic image GV7.1 described above. When a moving amount (moving angle) of an acoustic image is set to "large", the acoustic-image control unit 260 selects an acoustic image GV7.3 with a widened moving angle. In this manner, the acoustic-image control unit 260 acquires speed information of its own vehicle and changes a moving locus of an acoustic image according to the acquired speed information of its own vehicle such that a sense of movement corresponding to a field of vision of a driver can be transmitted to the user.

Then, the acoustic-image control unit 260 generates an "acoustic image control signal" on which the setting of an acoustic image creation range, the setting of moving speed of an acoustic image, and the setting of a moving amount of the acoustic image are reflected. In this manner, moving speed of an acoustic image is changed according to any one of an example sentence structure of voice guidance and an environment in which the voice guidance is listened to or both, whereby it is possible to transmit a sense of movement in a guiding direction to a driver clearly and perform effective route guidance.

In the navigation system 10 according to the second embodiment, when the "sense of movement control" for adding a sense of movement in a guiding direction is applied to a driver, attenuation control for other voice outputs like an audio output is performed to make it easy to listen to movement of an acoustic image.

The attenuation control table 250a is a table storing conditions for determining an ATT amount for performing attenuation control according to an output level of an audio output. For example, the attenuation control table 250a stores a volume level to be actually outputted as an audio output and an ATT amount corresponding to the volume level in association with each other.

To explain this more specifically, as shown in FIG. 17, the attenuation control table 250a stores an ATT amount "H (dB)", an ATT amount "J (dB)", and an ATT amount "K (dB)" in association with a volume level "large" (F (dB) or more), a volume level "medium" (e.g., G (dB) or more and less than F (dB)), and a volume level "small" (less than G (dB)), respectively. Note that, According to the second embodiment, to make it easy to listen to movement of an acoustic image, a relation of sizes of such parameters H, H, and C is set as "H>J>K" such that an ATT amount increases as a volume level of an audio output increases.

Here, the guide voice-output control unit 250 generates an "audio output attenuation signal" based on the "output level calculation result" of the audio signal received from the audio output control unit 320 and the "ATT amount determination conditions" stored in the attenuation control table 250a.

To explain this more specifically, when a volume level of music to be reproduced is "large" (i.e., when a volume level to be actually outputted as an audio output is F (dB) or more), the guide voice-output control unit 250 sets an ATT amount to "large" (i.e., H (dB)). When a volume level of music to be reproduced is "medium" (i.e., when a volume level to be actually outputted as an audio output is G (dB) or more and less than F (dB)), the guide voice-output control unit 250 sets an ATT amount to "medium" (i.e., J (dB)). When a volume level of music to be reproduced is "small" (i.e., a volume level to be actually outputted asan audio output is less than G (dB)), the guide voice-output control unit 250 sets an ATT amount to "small" (i.e., K(dB)).

Then, the guide voice-output control unit 250 generates an "audio output attenuation signal" on which this setting of an ATT amount is reflected. In this manner, when the guide voice-output control unit 250 calculates output levels of other voice outputs and outputs an acoustic image of voice guidance, the guide voice-output control unit 250 lowers the output levels of the other voice outputs according to the calculated output levels. This makes it possible to perform attenuation control corresponding to actual volume levels of the other volume outputs and improve easiness of listening to the voice guidance.

The communication between the navigation unit 20 and the speaker control unit 40 may be performed using a vehicle-mounted LAN function or may be performed via direct wiring. When the communication between the navigation unit 20 and the speaker control unit 40 is performed via direct wiring, wirings corresponding to a "route guidance voice signal", an "acoustic image control signal", and an "audio output attenuation signal", respectively, are formed from the navigation unit 20.

The "route guidance voice signal" is a signal indicating a waveform of voice to be outputted. An analog signal or a digital signal may be used as this signal. The "acoustic image control signal" is a signal indicating a creating position and contents of movement of an acoustic image. Text data or binary data can be used as the "acoustic image control signal". The "audio output attenuation signal" is a signal requesting output of a voice signal for route guidance, that is, requesting lowering of a reproduction output of music information outputted by the audio unit 30 or the like or stop of the reproduction. A binary signal or the like can be used as the "audio output attenuation signal".

Note that, here, basic control processing (1) of the guide voice-output control unit 250 and the acoustic-image control unit 260 will be explained and, then, "acoustic image control signal generation processing" (2) for generating an acoustic image control signal indicating a creating position and contents of movement of an acoustic image of voice guidance will be explained. Finally, "audio output attenuation signal generation processing" (3) for generating an audio output attenuate signal for controlling to attenuate other voice outputs will be explained.

Figure 18:
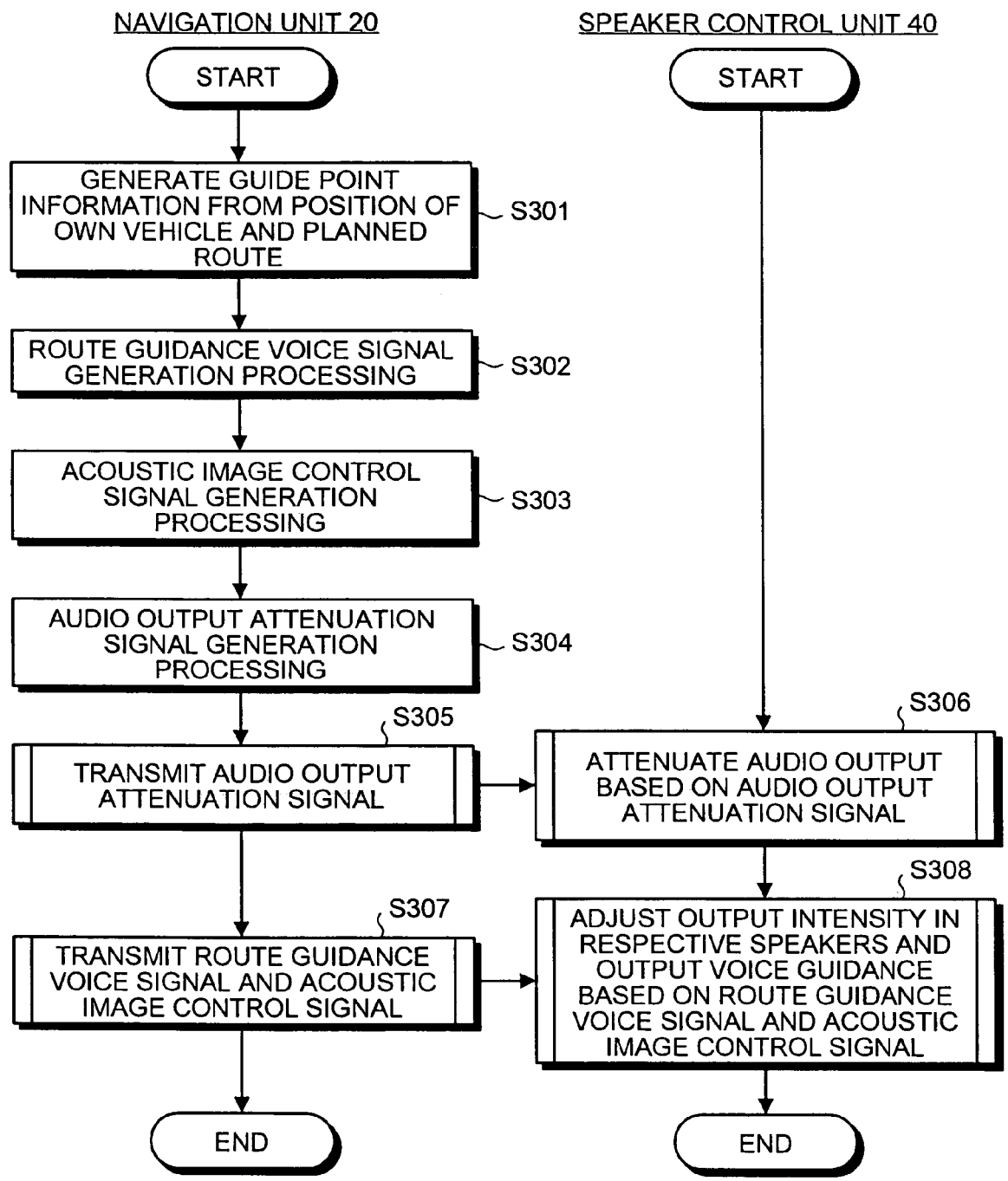
FIG. 18 is a flowchart of a procedure of basic control processing in a guide voice-output control unit and an acoustic-image control unit.

FIG. 18 is a flowchart of a procedure of the basic control processing in the guide voice-output control unit 250 and the acoustic-image control unit 260. A processing flow shown in FIG. 18 is executed recursively at the time when the navigation unit 20 operates.

First, the guide content creating unit 240 creates guide point information from a position and a planned route of its own vehicle (step S301). Then, the guide voice-output control unit 250 generates a "route guidance voice signal" indicating a waveform of voice guidance based on the guide point information created by the guide content creating unit 240 (step S302).

Subsequently, the acoustic-image control unit 260 generates an "acoustic image control signal" indicating a creating position and contents of movement of an acoustic image of the voice guidance based on the guide point information created by the guide content creating unit 240 (step S303). Moreover, the guide voice-output control unit 250 generates an "audio output attenuation signal" based on an output level calculation result of audio signal received from the audio output control unit 320 (step S304).

Here, the guide voice-output control unit 250 transmits the "audio output attenuation signal" to the speaker control unit 40 (step S305). The microcomputer 410 in the speaker control unit 40, which has received this "audio output attenuation signal", attenuates the audio output based on an ATT amount instructed by the received signal (step S306).

Subsequently, the guide voice-output control unit 250 and the acoustic-image control unit 260 transmit the "route guidance voice signal" and the "acoustic image control signal" to the speaker control unit 40, respectively, (step S307). The microcomputer 410 in the speaker control unit 40 adjusts output intensities in the speakers SP10 to SP40 and outputs voice guidance based on the "route guidance voice signal" and the "acoustic image control signal" (step S308).

In this manner, voice output control including sense of movement control (acoustic image localization control) of the voice guidance is performed on the "route guidance voice signal" and the "acoustic image control signal", and attenuation control for the audio output is performed based on the "audio output attenuation signal".

Figure 19:
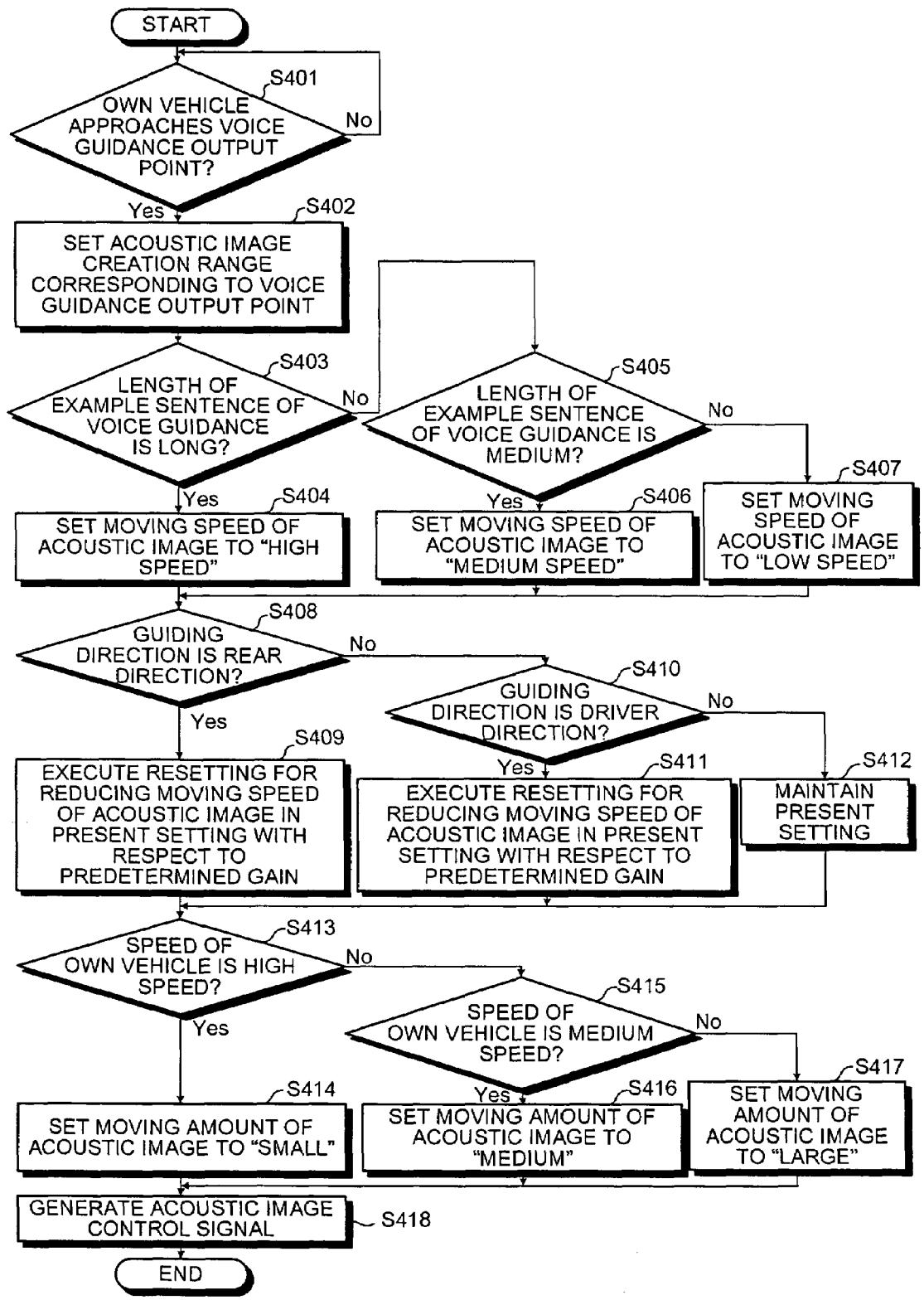
FIG. 19 is a flowchart of a procedure of acoustic image control signal generation processing according to the second embodiment.

FIG. 19 is a flowchart of a procedure of the acoustic image control signal generation processing according to the second embodiment. This processing is processing corresponding to step S303 in the basic control processing described in (1) above and is started after the "route guidance voice signal" is generated.

As shown in the figure, when its own vehicle approaches a voice guidance output point (Yes at step S401), the acoustic-image control unit 260 sets an acoustic image creation range corresponding to the voice guidance output point (step S402).

For example, when its own vehicle approaches a voice guidance output point at a short distance, the acoustic-image control unit 260 sets an acoustic image creation range to a short distance, that is, sets the acoustic image creation range 510. When its own vehicle approaches a voice guidance output point at a medium distance, the acoustic-image control unit 260 sets an acoustic image creation range to a medium distance, that is, sets the acoustic image creation range 520. When its own vehicle approaches a voice guidance output point at a long distance, the acoustic-image control unit 260 sets an acoustic image creation range to a long distance, that is, sets the acoustic image creation range 530.

After the end of the setting of the acoustic image creation range (step S402), when a length of an example sentence of voice guidance is "long" (Yes at step S403), the acoustic-image control unit 260 sets moving speed of an acoustic image to "high speed" (step S404).

On the other hand, when a length of an example sentence of voice guidance is "medium" (No at step S403 and Yes at step S405), the acoustic-image control unit 260 sets moving speed of an acoustic image to "medium speed" (step S406). When a length of an example sentence of voice guidance is "short" (No at step S403 and No at step S405), the acoustic-image control unit 260 sets moving speed of an acoustic image to "low speed" (step S407).

After the end of the setting of moving speed of an acoustic image (step S404, S406, or S407), when a guiding direction is the rear with respect to a driver (Yes at step S408), the acoustic-image control unit 260 performs resetting for lowering moving speed of an acoustic image in the present setting-with respect to a gain of the moving speed in the acoustic image control table 260a (step S409).

When a guiding direction is a direction of a driver seat (No at step S408 and Yes at step S410), the acoustic-image control unit 260 performs resetting for lowering moving speed of an acoustic image in the present setting with respect to a gain of the moving speed in the acoustic image control table 260a (step S411).

On the other hand, when a guiding direction is not the rear direction or the direction of the driver seat (No at step S408 and No at step S410), the acoustic-image control unit 260 performs resetting for maintaining the moving speed of an acoustic image in the present setting (step S412).

After the end of the resetting of moving speed of an acoustic image (step S409, S411, or S412), when speed of its own vehicle is "high speed" (Yes at step S413), the acoustic-image control unit 260 sets a moving amount of an acoustic image to "small" (step S414).

On the other hand, when speed of its own vehicle is "medium speed" (No at step S413 and Yes at step S415), the acoustic-image control unit 260 sets a moving amount of an acoustic image to "medium" (step S416). When speed of its own vehicle is "low speed" (No at step S413 and No at step S415), the acoustic-image control unit 260 sets a moving amount of an acoustic image to "large" (step S417).

After the setting of a moving amount of an acoustic image (step S414, S416, or S417), the acoustic-image control unit 260 generates an "acoustic image control signal" on which the setting of an acoustic image creation range, the setting of moving speed of an acoustic image, and the setting of a moving amount of an acoustic image (step S418) and ends the processing.

Figure 20:
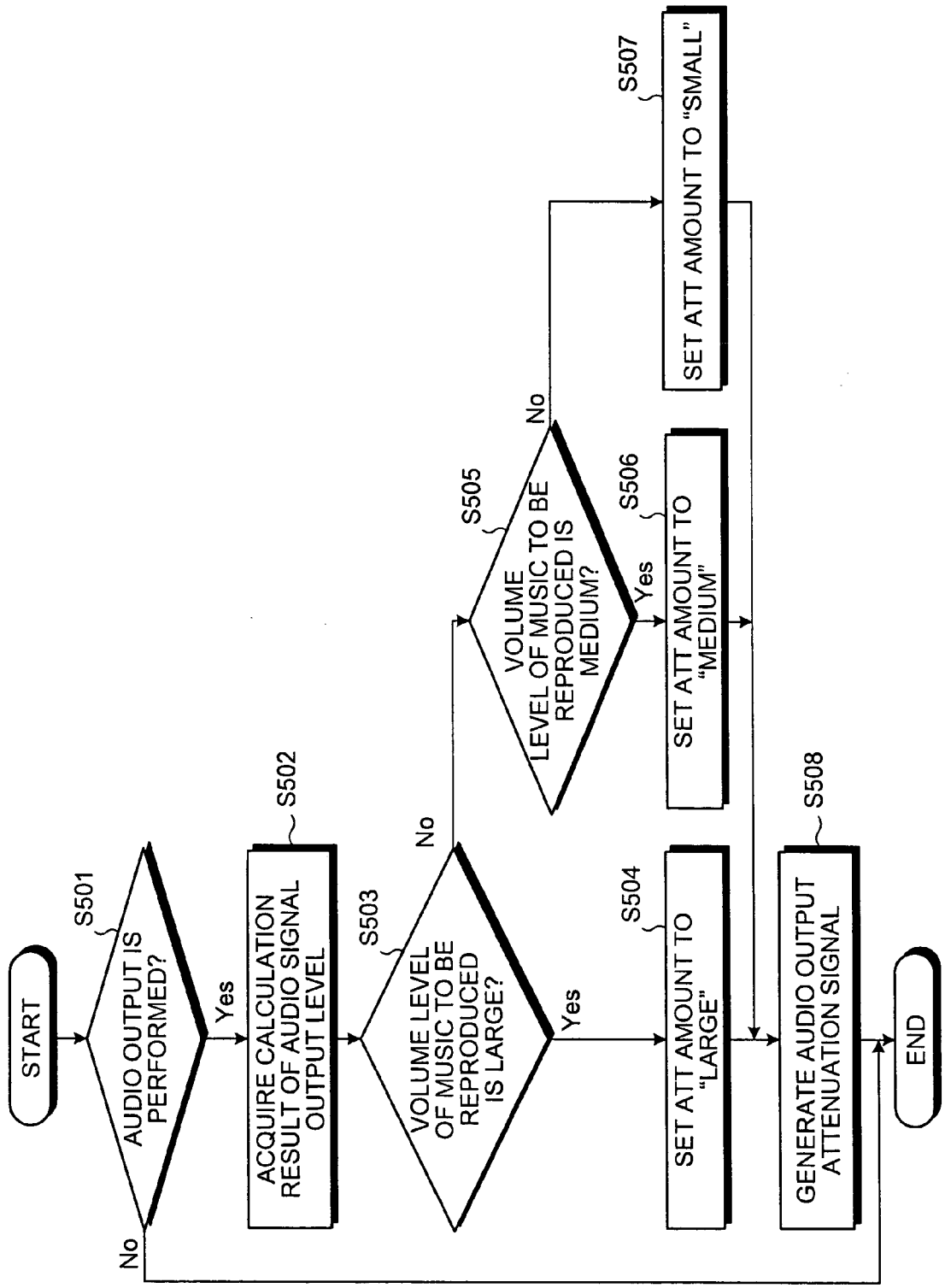
FIG. 20 is a flowchart of a procedure of audio output attenuation signal generation processing according to the second embodiment.

FIG. 20 is a flowchart of a procedure of the audio output attenuation signal generation processing according to the second embodiment. This processing is processing corresponding to step S304 in the basic control processing described in (1) above and is started after an "acoustic image control signal" is generated. Note that, when an audio output is not performed (step S501), this processing is not executed.

As shown in the figure, when an audio output is detected (step S501), the guide voice-output control unit 250 acquires an "output level calculation result" of an audio signal from the audio output control unit 320 (step S502).

When a volume level of music to be reproduced is "large" (Yes at step S503), the guide voice-output control unit 250 sets an ATT amount to "large". On the other hand, when a volume level of music to be reproduced is "medium" (No at step S503 and Yes at step S505), the guide voice-output control unit 250 sets an ATT amount to "medium". When a volume level of music to be reproduced is "small" (No at step S503 and No at step S505), the guide voice-output control unit 250 sets an ATT amount to "small" (step S507).

After the setting of an ATT amount (step S504, S506, or S507), the guide voice-output control unit 250 generates an "audio output attenuation signal" on which this setting of an ATT amount is reflected (step S508) and ends the processing.

As described above, according to the navigation system 10 according to the second embodiment, moving speed of an acoustic image is changed according to an example sentence structure of voice guidance and an environment in which the voice guidance is listened to. Thus, it is possible to transmit a sense of movement in a guiding direction to a driver clearly and perform effective route guidance.

According to the navigation system 10 according to the second embodiment, output levels of other voice outputs are calculated and, when an acoustic image of voice guidance is outputted, output levels of the other voice outputs are lowered according to the calculated output levels. Thus, it is possible to perform attenuation control according to actual volume levels of the other voice outputs and improve easiness of listening to the voice guidance.

According to the second embodiment, the navigation system performs the "sense of distance control" for changing a relative distance of an acoustic image with respect to a driver according to a distance from a position of its own vehicle to a guiding position (guide point) corresponding to a guiding direction. However, According to the third embodiment, the navigation system performs "sense of distance control" for changing a tone of voice guidance according to a distance from a position of its own vehicle to a guide point. Note that, here, a structure of the navigation system according to the third embodiment will be explained and, then, procedures of respective kinds of processing will be explained.

FIG. 21 is a schematic diagram of a schematic structure of the navigation system 10 according to the third embodiment. As shown in the figure, the navigation system 10 according to the third embodiment is different from the navigation system according to the second embodiment in that the navigation system 10 according to the third embodiment includes a voice guidance output control table 250b.

This voice guidance output control table 250b is a table storing voice guidance creation conditions for performing output control for voice guidance according to an environment in which the voice guidance is listened to and a distance from a position of its own vehicle to a guide point. For example, the voice guidance output control table 250b stores a distance from a position of its own vehicle to the guide point and a frequency band, in which guidance information is outputted as voice guidance to give a sense of distance corresponding to the distance to a driver, in association with each other.

More specifically, as shown in FIG. 22A, the voice guidance output control table 250b stores a frequency band "high frequency" (e.g., L (Hz) to M (Hz)), a frequency band "medium frequency" (e.g., N (Hz) to P (Hz)), and a frequency band (low frequency) (e.g., Q (Hz) to R (Hz)) in association with a distance from its own vehicle to a guide point "near", a distance from its own vehicle to a guide point "farther than near and less than 300 m", and a distance from its own vehicle to a guide point "300 m or more and less than 700 m", respectively. Note that, According to the third embodiment, a frequency band, in which guidance information is outputted as voice guidance, is set higher to render a sense of distance when a distance from its own vehicle to the guide point is shorter. In this case, it is assumed that the parameters L, M, N, P, and Q are in a relation of "L<M", "N<P", "Q<R", and "L>N>Q".

Moreover, the voice guidance output control table 250b stores "speed" of its own vehicle and an output level of voice guidance corresponding to a noise level estimated from the "speed" in association with each other. More specifically, as shown in FIG. 22B, the voice guidance output control table 250b stores an output level of voice guidance "large" (e.g., S (dB)), an output level of voice guidance "medium" (e.g., T (dB)), and an output level of voice guidance "small" (e.g., U (dB)) in association with speed of its own vehicle "high speed" (80 km/h or more), speed of its own vehicle "medium speed" (40 km/h or more and less than 80 km/h), and speed of its own vehicle "low speed" (less than 40 km/h). Note that, According to the third embodiment, assuming that a noise level of load noise or the like increases as speed of the own vehicle increases, a relation of sizes of the parameters S, T, and U is set as "S>T>U" such that an output level of voice guidance increases as speed of the own vehicle increases.

Here, the guide voice-output control unit 250 generates a "route guidance voice signal" indicating a waveform of voice guidance based on "speed information" of its own vehicle acquired by the vehicle speed acquiring unit 230, "guide point information" created by the guide content creating unit 240, and "voice guidance creation conditions" stored in the voice guidance output control table 250b.

The guide voice-output control unit 250 sets a frequency band, in which guidance information should be outputted as voice guidance, according to a distance from a position of its own vehicle to a guide point with reference to the voice guidance output control table 250b. More specifically, when a distance from its own vehicle to a guide point is "near", the guide voice-output control unit 250 sets a frequency band, in which guidance information is outputted as voice guidance, to "high frequency" (i.e., L (Hz) to M (Hz)). When a distance from its own vehicle to a guide point is "farther than near and less than 300 m", the guide voice-output control unit 250 sets a frequency band, in which guidance information is outputted as voice guidance, to "medium frequency" (i.e., N (Hz) to P (Hz)). When a distance from its own vehicle to a guide point is "300 m or more and less than 700 m", the voice guidance output control table 250b sets a frequency band, in which guidance information is outputted as voice guidance, to "low frequency" (i.e., Q (Hz) to R (Hz)).

In addition, as a structure for executing filter processing corresponding to the setting of such frequency bands, it is assumed that the DSP 430 of the speaker control unit 40 includes a band-pass filter (BPF) that extracts a voice signal in a frequency band, in which guidance information should be outputted as voice guidance, from the "route guidance voice signal".

In this manner, the navigation system determines a frequency band, in which guidance information should be outputted as voice guidance, according to a distance from a position of its own vehicle to a guiding position corresponding to a guiding direction, and the filter processing for extracting a voice signal of the determined frequency band from the voice guidance. This makes it possible to transmit a sense of distance from the position of the own vehicle to the guiding position corresponding to the guiding direction with a tone and perform effective sense of distance control while maintaining a volume level.

The guide voice-output control unit 250 sets an output level of voice guidance corresponding to a noise level estimated from speed of its own vehicle with reference to the voice guidance output control table 250b. More specifically, when speed of its own vehicle is "high speed" (80 km/h or more), the guide voice-output control unit 250 sets an output level of voice guidance to "large" (i.e., S (dB)). When speed of its own vehicle is "medium speed" (40 km/h or more and less than 80 km/h), the guide voice-output control unit 250 sets an output level of voice guidance to "medium" (e.g., T (dB)). When speed of its own vehicle is "low speed" (less than 40 km/h), the guide voice-output control unit 250 sets an output level of voice guidance to "small" (e.g., U (dB)).

In this manner, a noise level with respect to voice guidance is detected, and an output level of the voice guidance is changed according to the detected noise level, whereby it is possible to improve easiness of listening to the voice guidance.

FIG. 23 is a flowchart showing a procedure of route guidance voice signal generation processing according to the third embodiment. This processing is processing corresponding to step S302 in the basic control processing of (1) described above According to the second embodiment and is started when guide point information is created by the guide content creating unit 240.

As shown in the figure, when a distance from its own vehicle to a guide point is "near" (Yes at step S601), the guide voice-output control unit 250 sets a frequency band, in which guidance information is outputted as voice guidance, to "high frequency" (step S602).

On the other hand, when a distance from the own vehicle to the guide point is "farther than near and less than 300 m" (No at step S601 and Yes at step S603), the guide voice-output control unit 250 sets a frequency band, in which guidance information is outputted as voice guidance, to "medium frequency" (step S604).

When a distance from its own vehicle to a guide point is "300 m or more and less than 700 m" (No at step S601 and No at step S603), the guide voice-output control unit 250 sets a frequency band, in which guidance information is outputted as voice guidance, to "low frequency" (step S605).

After the end of the setting of a frequency band in which guidance information is outputted as voice guidance (steps S602, S604, and S605), when speed of its own vehicle is "high speed" (Yes at step S606), the guide voice-output control unit 250 sets an output level of the voice guidance to "large" (step S607).

On the other hand, when speed of its own vehicle is "medium speed" (No at step S606 and Yes at step S608), the guide voice-output control unit 250 sets an output level of the voice guidance to "medium" (step S609).

When speed of its own vehicle is "low speed" (No at step S606 and No at step S608), the guide voice-output control unit 250 sets an output level of the voice guidance to "small" (step S610).

After the end of the setting of an output level of voice guidance (steps S607, S609, and S610), the guide voice-output control unit 250 generates a "route guidance voice signal" on which the setting of a frequency band, in which guidance information is outputted as voice guidance, and the setting of an output level of the voice guidance are reflected (step S611) and ends the processing.

As described above, according to the navigation system 10 according to the third embodiment, a frequency band, which should be outputted as voice guidance, is determined according to a distance from a position of its own vehicle to a guiding position corresponding to a guiding direction, and filter processing for extracting a voice signal of the determined frequency band from the voice guidance. This makes it possible to transmit a sense of distance from the position of its own vehicle to the guiding position corresponding to the guiding direction with a tone and perform effective sense of distance control while maintaining a volume level.

According to the navigation system 10 according to the third embodiment, a noise level with respect to voice guidance is detected, and an output level of the voice guidance is changed according to the detected noise level. This makes it possible to further improve easiness of listening to the voice guidance.

The first to the third embodiments of the present invention have been explained so far. However, the present invention may be carried out in various different embodiments within a range of the technical thought described in patent claims other than the embodiments described above. Thus, as described below, the different embodiments will be explained by classifying the embodiments into structure, sense of movement control, sense of distance control, voice output control for plural output voices including voice guidance, cooperation with other apparatuses, and others.

The structures described in the second and the third embodiments are examples of use of the present invention and may be carried out in various kinds of modifications. For example, although a navigation unit, an audio unit, and a speaker control unit are constituted independently in the second and the third embodiments, these units may be constituted integrally.

According to the second embodiment, the navigation system changes moving speed of an acoustic image according to a length of an example sentence of voice guidance. However, the present invention is not limited to this, and the navigation system may change moving speed of an acoustic image according to the number of words of acoustic guidance, the number of read characters of the voice guidance, a data size of the voice guidance, or the like.

According to the present invention, the navigation system may change moving speed of an acoustic image according to not only a length of an example sentence of voice guidance but also speed information of its own vehicle. For example, moving speed of an acoustic image is set to "high speed" when speed of the own vehicle is "high speed", and moving speed of an acoustic image is set to "low speed" when speed of the own vehicle is "low speed". Therefore, the navigation system can transmit a sense of movement corresponding to a behavior of its own vehicle.

In relation to the above, According to the second embodiment, when the navigation system changes a moving locus according to speed information of its own vehicle, a moving angle of an acoustic image is narrowed when speed of the own vehicle is "high speed" and a moving angle of an acoustic image is widened when speed of the own vehicle is "low speed" such that it is possible to transmit a sense of movement corresponding to a field of vision of a driver. However, the present invention is not always limited to this.

When speed of the own vehicle is high, since the driver concentrates in vehicle operation, it is difficult for the driver to perceive movement of an acoustic image of voice guidance. Therefore, a moving angle of the acoustic image is widened when speed of the own vehicle is "high speed", whereby it is possible to make it easy for the driver to perceive movement of the acoustic image of the voice guidance.

Similarly, when moving speed is changed according to speed information of its own vehicle, the navigation system sets moving speed of an acoustic image to "high speed" when speed of its own vehicle is "high speed" and sets moving speed of an acoustic image to "low speed" when speed of its own vehicle is "low speed" such that it is possible to transmit a sense of movement corresponding to a behavior of its own vehicle. However, the present invention is not always limited to this. It is also possible that the navigation system sets moving speed of an acoustic image to "low speed" when speed of its own vehicle is "high speed" and sets moving speed of an acoustic image to "high speed" when speed of the own vehicle is "low speed" to make it easy for the driver to perceive movement of an acoustic image of voice guidance.

In this manner, when "moving speed of an acoustic image" and a "moving amount of an acoustic image" are changed according to speed information of the own vehicle, there are advantages and disadvantages depending on cases. Thus, the navigation system may operate after receiving arbitrary setting input from a user on the sense of movement control setting screen 600 shown in FIG. 24.

According to the present invention, it is also possible that moving speed of an acoustic image in a section of a break of voice guidance is set high compared with moving speed of an acoustic image in other sections. For example, when voice guidance "to the right direction ahead" is outputted by voice, moving speed of an acoustic image in a section of a break between a voice output of "ahead" and a voice output of "to the right direction" is set high compared with moving speed of an acoustic image in voice output sections of "ahead" and "to the right direction". This makes it possible to use the section of the break of voice guidance as an accent of acoustic image movement and improve easiness of listening to voice guidance while transmitting a sense of movement in a guiding direction to the driver smoothly. Note that an acoustic image may be moved only in the section of the break of voice guidance. The same effect is obtained in this case.

According to the present invention, when acoustic image localization control for voice guidance is performed, a phase of an output voice on a passenger seat side may be reversed to output voice. In other words, when a guiding direction is a direction of the deriver seat (e.g., the right direction), simply by lowering a volume level of a speaker on the left side (passenger seat side), an acoustic image gets closer to a position of the speaker on the driver side, and it is difficult to move the acoustic image further in the right direction and away from the speaker position.

Thus, a phase of an output voice on the left side (passenger seat side) is reversed to output a voice such that it is possible to virtually increase a moving distance of an acoustic image in the direction of the driver seat and to transmit a sense of movement of the acoustic image in the direction of the driver seat more clearly. In this case, it is possible to improve a degree of freedom of acoustic image localization control more effectively by limiting a frequency band in which voice guidance is outputted by voice.

According to the third embodiment, the navigation system outputs voice guidance in a frequency band corresponding to a distance from a position of its own vehicle to a guide point by voice and transmits a sense of distance from the position of the own vehicle to the guide point with a tone. However, the present invention is not limited to this, and it is also possible that a volume level of reverberant sound added to voice guidance is determined according to a distance from a position of the own vehicle to a guide point, and reverberant sound of the determined volume level is added to the voice guidance.

In other words, reverberant sound is added such that reverberation time increases as a distance form the own vehicle to a guide point increases, whereby it is possible to transmit a sense of distance from a position of the own vehicle to the guide point in a length of the reverberation time and perform effective sense of distance control while maintaining a volume level.

Similarly, according to the present invention, it is also possible that an acoustic image position at the time when acoustic image localization control is performed is changed to the upward direction or the downward direction. For example, an acoustic image is localized in the upward direction as the position of the own vehicle is closer to the guide point, and an acoustic image is localized to the downward direction as the position of the own vehicle is more distant from the guide point.

In general, a navigation system is required to set a volume level of voice guidance small for "sense of distance control" that is performed when a distance from a position of its own vehicle to a guide point is "far" compared with "sense of distance control" that is performed when the distance to the guide point is "near". Therefore, when other voice outputs are subjected attenuation control, if an ATT amount identical with that in the "sense of distance control" that is performed when the distance from the own vehicle to the guide point is near, it is difficult to for the navigation system to transmit a sense of distance to a driver clearly when the distance from the position of its own vehicle to the guide point is "far".

Thus, according to the present invention, when an acoustic image of voice guidance is outputted, the navigation system changes a rate of lowering of output levels of other voice outputs according to the distance from the position of its own vehicle to the guide point such that it is possible to improve easiness of listening to voice guidance.

According to the second embodiment, actual output levels of other voice outputs (e.g., an audio output) are calculated using an integrated circuit or the like and output levels of other voice outputs are lowered according to the calculated actual output levels of the other voice outputs. However, the present invention is not always limited to this. When an acoustic image of voice guidance is outputted, output levels of the other voice outputs are lowered according to output-level adjustment information (e.g., volume position information received via an input device like a volume switch or button) according to the other voice outputs, whereby the same effect is obtained with a simple structure without providing new equipment.

According to the third embodiment, the navigation system estimates a noise level from speed information of its own vehicle and changes an output level of voice guidance according to the estimated noise level. However, it is also possible that a microphone is installed in its own vehicle, and an output level of voice guidance is changed according to power (i.e., noise level) of the installed microphone. Consequently, the navigation system can detect an accurate noise level regardless of a running environment of its own vehicle like a state of a road surface, and it is possible to improve easiness of listening to voice guidance more effectively.

In relation to the above, as shown in FIG. 25, an arbitrary setting is received from a user on a voice guidance volume control screen 700, whereby the navigation system can estimate a noise level according to speed information of its own vehicle, detect a noise level with a microphone, or detect a noise level accurately by combining the estimation and the detection.

When both the detection methods are combined, if the navigation system prioritizes the estimation of a noise level according to speed information of its own vehicle compared with the detection of a noise level with a microphone, it is possible to improve easiness of listening to voice guidance even when speed is varied at a toll gate or the like of an expressway. In addition, if the navigation system prioritizes the detection of a noise level with a microphone compared with the estimation of a noise level according to speed information of its own vehicle, the navigation system can improve easiness of listening to voice guidance even when its own vehicle runs on a road surface on which road noise often occurs.

According to the present invention, when a voice output request for voice guidance and a voice output request for a hand-free voice conflict with each other, the navigation system performs control such that the hand-free voice is outputted preferentially. In other words, when the navigation system 1 is connected to a communication apparatus like a cellular phone, if a voice output request is received from the communication apparatus, the navigation system 1 prioritizes an output of an output voice (hand-free voice) from the communication apparatus even during an output of voice guidance. This makes it possible to prevent hand-free call from being hindered by the voice guidance.

The navigation system may perform control such that a setting for a priority for a voice output is received when voice output requests for plural output voices conflict with each other and, when an output request for voice guidance and an output request for a hand-free voice conflict with each other, an output voice based on the received priority is outputted preferentially.

Figure 26:
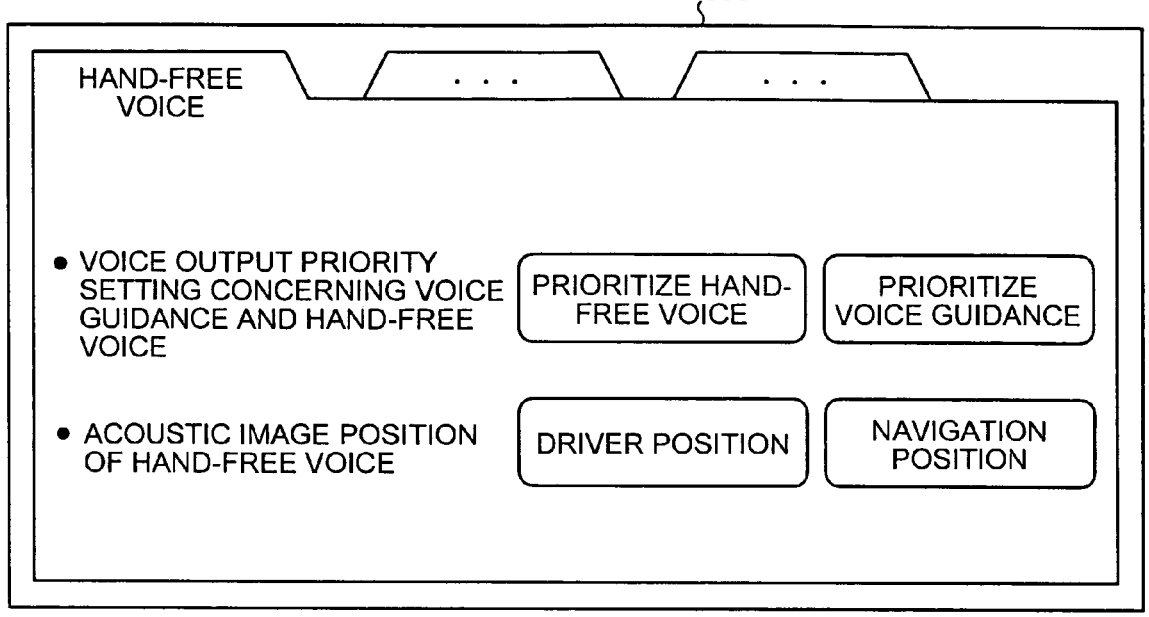
FIG. 26 is a diagram of an example of a voice output priority setting reception screen.

For example, as shown in FIG. 26, on a voice output priority setting reception screen 800, a user indicates which of a setting prioritizing a voice output of "hand-free voice" and a setting prioritizing a voice output of "voice guidance" is adopted, and the navigation system receives the setting and outputs an output voice based on the received setting preferentially. This makes it possible to output an output voice requested by the user preferentially.

Note that, even when the setting prioritizing a voice output of "voice guidance" is adopted, the navigation system may take counter measures like sending a "hold message" to a communication partner while outputting the "voice guidance".

According to the present invention, when vehicle information and communication system (VICS) information is received in a VICS receiver, an acoustic image of the VICS information is localized in a position (e.g., a ceiling) distinguished from acoustic image positions of other voice outputs. Consequently, it is possible to cause a user to listen to the VISC information by distinguishing the VISC information from other output voices (i.e., voice guidance, an audio output, and the like).

According to the present invention, when an electronic toll collection system (ETC) is present as a guide point to which vehicle operation should be guided, the navigation system performs acoustic image localization control for localizing an acoustic image in a direction in which an ETC gate is present with respect to a driver. In other words, the navigation system performs acoustic image localization control for moving an acoustic image of voice guidance to indicate a direction of an ETC lane and a distance to the ETC gate. This makes it possible to cause the driver to perceive the direction of the ETC gate intuitively and contribute to reduction of toll gate passing time.

According to the present invention, the navigation system may control at least one of a direction change position of an acoustic image, a moving amount of the acoustic image, a moving speed of the acoustic image, a moving locus of the acoustic image, a frequency band in which guidance information is outputted by voice, a reverberant noise level to be added to an output voice of the guidance information, a voice output level of the guidance information, output levels of other voices, and speed of the output voice of the guidance information (utterance speed of the voice guidance) according to at least one of an age of a listener, listening characteristics of the listener, and a frequency of deviation from a planned route. This makes it possible to perform route guidance according to the age of the driver, the listening characteristics of the driver, and a degree of transmission of the planned route.

Note that the present inventions carried out in the first, the second, and the third embodiments have been explained individually. However, the present invention is not limited to a case in which these inventions are carried out individually. In other words, According to the present invention, it is possible to freely combine and carry out the first, the second, the third, and the fourth embodiments.

Among the respective kinds of processing explained in the embodiments, all or a part of those explained as being performed automatically can also be performed manually or all or a part of those explained as being performed manually can also be performed automatically. Besides, it is possible to arbitrarily change the processing procedures, the control procedures, the specific names, and the information including various kinds of data and parameters indicated in the above description and the drawings unless specifically noted otherwise.

The respective elements of the respective devices shown in the figures are functionally conceptual and are not always required to be constituted physically as shown in the figures. In other words, specific forms of distribution and integration of the respective devices are not limited to those shown in the figures, and it is possible to distribute and integrate all or a part of the devices functionally or physically by an arbitrary unit according to various loads, states of use, or the like. Moreover, all or a part of the respective processing functions to be performed in the respective devices are realized by a CPU and a programs that is analyzed and executed in the CPU or realized as hardware according to a wired logic.

According to the present invention, a first guiding direction, in which vehicle operation should be guided, and a second guiding direction, in which the vehicle operation should be guided following the first guiding direction, are acquired from planned route information and current position information, guidance information is created, an acoustic image for notifying the guidance information is created based on the created guidance information, and a direction of movement of the acoustic image is determined in a single direction when the guidance information is notified continuously. Thus, there is an effect that it is possible to obtain a navigation apparatus that increases an amount of information to be transmitted without imposing a burden on a driver to thereby perform effective route guidance.

Furthermore, according to the present invention, when the first guiding direction and the second guiding direction are different, an acoustic image for informing the driver of the first guiding direction and the second guiding direction is created in a direction corresponding to the first guiding direction. Thus, there is an effect that it is possible to obtain a navigation apparatus that is capable of transmitting time series route information effectively without confusing the driver.

Moreover, according to the present invention, at least one of a movement start position of the acoustic image, a direction change position of the acoustic image, a moving amount of the acoustic image, moving speed of the acoustic image, and a moving locus of the acoustic image is changed based on a guiding position of the planned route information and the position information. Thus, there is an effect that a driver can grasp a relative sense of distance and it is possible to obtain a navigation apparatus that performs more effective route guidance.

Furthermore, according to the present invention, moving speed of the acoustic image is changed according to any one of a structure of an example sentence of the guidance information and an environment in which the guidance information is listened to or both. Thus, there is an effect that it is possible to obtain a navigation apparatus that is capable of transmitting a sense of movement in a guiding direction to a driver clearly and performing effective route guidance.

Moreover, according to the present invention, a guiding direction, in which vehicle operation should be guided, is acquired from the planned route information and the current position information, guidance information is created, an acoustic image for notifying the guidance information is created based on the acquired guiding direction, and at least one of a movement start position of the acoustic image, a direction change position of the acoustic image, an amount of movement of the acoustic image, moving speed of the acoustic image, and a moving locus of the acoustic image is changed based on a guiding position of the planned route information and the current position information. Thus, there is an effect that a driver can grasp a relative sense of distance and a sense of distance and it is possible to obtain a navigation apparatus that performs more effective route guidance.

Furthermore, according to the present invention, a guiding direction, in which vehicle operation should be guided, is acquired from the planned route information and the current position information, guidance information is created, an acoustic image for notifying the guidance information is created based on the acquired guiding direction, and moving speed of the acoustic image is changed according to a structure of any one of an example sentence of the guidance information and an environment in which the guidance information is listened to or both. Thus, there is an effect that it is possible to obtain a navigation apparatus that is capable of transmitting a sense of movement in the guiding direction to a driver clearly and performing effective route guidance.

Moreover, according to the present invention, moving speed of the acoustic image is changed according to a length of an example sentence of the guidance information. Thus, there is an effect that it is possible to obtain a navigation apparatus that is capable of making timing for converging an acoustic image of voice guidance in a guiding direction and timing for ending a voice output of the voice guidance to coincide with each other and transmitting a sense of movement in the guiding direction to a driver more clearly.

Furthermore, according to the present invention, moving speed in a section of a break of the guidance information is set high compared with moving speed in other sections. Thus, there is an effect that it is possible to obtain a navigation apparatus that is capable of using a section of a break of voice guidance as an accent of acoustic image movement and improving easiness of listening to the voice guidance while transmitting a sense of movement in a guiding direction to a listener smoothly.

Moreover, according to the present invention, when the guiding direction, the first guiding direction, or the second guiding direction is a listener side, an acoustic image is moved at low speed compared with speed at the time when the acoustic image is moved in a direction different from the listener side. Thus, there is an effect that it is possible to obtain a navigation apparatus that is capable of transmitting a sense of movement in a guiding direction to the listener smoothly.

Furthermore, according to the present invention, when the guiding direction, the first guiding direction, or the second guiding direction is the rear direction, an acoustic image is moved at low speed compared with speed at the time when the acoustic image is moved in other directions. Thus, there is an effect that it is possible to obtain a navigation apparatus that is capable of transmitting a sense of movement in a guiding direction to a listener smoothly.

Moreover, according to the present invention, movement of the acoustic image is started from the front of the driver. Thus, there is an effect that it is possible to obtain a navigation apparatus that is capable of transmitting a planned route to a driver in a manner easy to listen to and effectively.

Furthermore, according to the present invention, when the guiding direction, the first guiding direction, or the second guiding direction is the rear, the acoustic image is moved to the front and then moved to the rear side. Thus, there is an effect that it is possible to obtain a navigation apparatus that is capable of transmitting a planned route to a driver in a manner easy to listen to and complying with an actual behavior of a vehicle.

Moreover, according to the present invention, an acoustic image is moved in an upward direction or a downward direction according to a distance from the current position to a guiding position of the planned route information. Thus, there is an effect that it is possible to obtain a navigation apparatus that is capable of performing effective sense of distance control while maintaining a volume level.

Furthermore, according to the present invention, the guiding direction, the first guiding direction, or the second guiding has information on a height, and a height of an acoustic image with respect to a listener is further controlled. Thus, there is an effect that a driver is capable of grasping gradient information of an actual road sensuously and it is possible to obtain a navigation apparatus that performs more effective route guidance.

Moreover, according to the present invention, the guiding direction, the first guiding direction, or the second guiding direction is a direction in which an automatic toll collecting apparatus is present. Thus, there is an effect that it is possible to obtain a navigation apparatus that is capable of causing a driver to perceive the direction of the automatic toll collecting apparatus intuitively and contributing to reduction in toll gate passing time.

Furthermore, according to the present invention, speed information is acquired, and at least one of a movement start position of the acoustic image, a direction change position of the acoustic image, a moving amount of the acoustic image, moving speed of the acoustic image, and a moving locus of the acoustic image is changed according to the speed information. Thus, there is an effect that it is possible to obtain a navigation apparatus that is capable of transmitting a sense of movement according to a behavior of its own vehicle and a sense of movement according to a field of vision of a driver.

Moreover, according to the present invention, at least one of a voice output of the guidance information and other voice outputs is controlled. Thus, there is an effect that it is possible to obtain a navigation apparatus that is capable of improving easiness of listening to voice guidance while realizing any one of effective sense of movement control and sense of distance control or both.

Furthermore, according to the present invention, a phase of an output voiced of the guidance information outputted from a side different from a listener side is reversed. Thus, there is an effect that it is possible to obtain a navigation apparatus that is capable of virtually increase a moving distance of an acoustic image in a direction of a listener and transmitting a sense of movement of the acoustic image in the direction of the listener more clearly.

Moreover, according to the present invention, a frequency band of an output voice of the guidance information is controlled according to a distance from the current position to a guiding position of the planned route information. Thus, there is an effect that it is possible to obtain a navigation apparatus that is capable of transmitting a sense of distance from a position of its own vehicle to a guiding position corresponding to a guiding direction with a tone and performing effective sense of distance control while maintaining a volume level.

Furthermore, according to the present invention, a level of reverberant sound added to an output voice of the guidance information is controlled according to a distance from the current position to a guiding position of the planned route information. Thus, there is an effect that the navigation system can transmit a sense of distance from a position of its own vehicle to a guide point with a length of reverberation time and perform effective sense of distance control while maintaining a volume level.

Moreover, according to the present invention, a noise level is detected, and a level of an output voice of the guidance information is controlled according to the detected noise level. Thus, there is an effect that it is possible to obtain a navigation apparatus that is capable of further improving easiness of listening to voice guidance.

Furthermore, according to the present invention, a noise level is detected based on at least one of speed information and an output from an installed microphone. Thus, there is an effect that it is possible to obtain a navigation apparatus that is capable of improving easiness of listening to voice guidance even when speed of its own vehicle and a drive environment vary every moment.

Moreover, according to the present invention, when a voice output of the guidance information is performed, output levels of other voices are lowered any one of before a voice output of the guidance information and during the voice output or both, and the output levels of the other voice outputs are recovered before the end of the voice output of the guidance information or after the end of the voice output. Thus, there is an effect that it is possible to obtain a navigation apparatus that realizes a voice output a driver can listen to easily.

Furthermore, according to the present invention, at least one of the lowering of the output levels of the other voice outputs and the recovery of the output levels of the other voice outputs is performed stepwise. Thus, there is an effect that it is possible to obtain a navigation apparatus that realizes a voice output a driver can listen to easily and with a less sense of incompatibility while reducing a sense of incompatibility at the time of start of route guidance by voice.

Moreover, according to the present invention, the lowering of the output levels of the other voice outputs is performed stepwise, the recovery of the output levels of the other voice outputs is performed stepwise, and a rate of lowering of the output level of the other voice and a rate of recovery of the output levels of the other voice outputs are controlled independently. Thus, there is an effect that it is possible to obtain a navigation apparatus that starts route guidance promptly and realizes a voice output with a less sense of incompatibility.

Furthermore, according to the present invention, the output levels of the other voice outputs are lowered stepwise at a predetermined rate of lowering before an output of an acoustic image, and the output levels of the other voice outputs are recovered stepwise at a rate of recovery smaller than the rate of lowering after the end of an output of the acoustic image. Thus, there is an effect that it is possible to obtain a navigation apparatus that starts route guidance promptly and realizes a voice output with a less sense of incompatibility.

Moreover, according to the present invention, the rate of lowering of the output levels of the other voice outputs is changed according to a distance between the current position and a guiding position of the planned route information. Thus, there is an effect that it is possible to obtain a navigation apparatus that is capable of improving easiness of listening to voice guidance.

Furthermore, according to the present invention, in the case of a voice output of the guidance information, the output levels of the other voice outputs are lowered according to output-level adjustment information of the output levels of the other voice outputs. Thus, there is an effect that it is possible to obtain a navigation apparatus that is capable of improving easiness of listening to voice guidance with a simple structure without providing new equipment.

Moreover, according to the present invention, output levels of the other voice outputs are detected, and when a voice output of the guidance information is performed, output levels of the other voice outputs are lowered according to the detected output level. Thus, there is an effect that it is possible to obtain a navigation apparatus that is capable of performing attenuation control according to actual volume levels of other voice outputs and improving easiness of listening to voice guidance.

Furthermore, according to the present invention, at least one of a direction change position of the acoustic image, a moving amount of the acoustic image, moving speed of the acoustic image, a moving locus of the acoustic image, a frequency band for a voice output of the guidance information, a reverberant sound level added to an output voice of the guidance information, a voice output level of the guidance information, output levels of the other voice outputs, and speed of an output voice of the guidance information is controlled according to at least one of an age of a listener, listening characteristics of the listener, and a frequency of deviation from a planned route. Thus, there is an effect that it is possible to obtain a navigation apparatus that is capable of performing route guidance according to an age of a driver, listening characteristics of the driver, and a degree of transmission of a planned route.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A navigation apparatus that performs a route guidance for a vehicle based on preset route information and current position information, the navigation apparatus comprising:
a guidance-information creating unit that creates guidance information by acquiring a first guiding direction, in which the vehicle should be guided on a first point, and a second guiding direction, in which the vehicle should be guided on a second point following the first guiding direction, from the preset route information and the current position information;
an acoustic-image creating unit that creates an acoustic image for notifying a driver of the guidance information; and
an acoustic-image control unit that controls, when the second point is close to the first point, a direction of movement of the acoustic image in a single direction.

2. The navigation apparatus according to claim 1, wherein, when the first guiding direction and the second guiding direction are different, the acoustic-image control unit controls the direction of movement of the acoustic image in the first guiding direction.

3. The navigation apparatus according to claim 1, wherein the acoustic-image control unit changes at least one of a movement start position of the acoustic image, a direction change position of the acoustic image, a moving amount of the acoustic image, a moving speed of the acoustic image, and a moving locus of the acoustic image according to the current position information and a guiding position in the preset route information.

4. The navigation apparatus according to claim 1, wherein the acoustic-image control unit changes the moving speed of the acoustic image according to at least one of an example sentence structure of the guidance information and an environment in which the guidance information is heard.

5. The navigation apparatus according to claim 1, wherein the acoustic-image control unit moves the acoustic image in an upward direction or a downward direction according to a distance between a current position and a guiding position in the preset route information.

6. A navigation apparatus that performs a route guidance for a vehicle based on preset route information and current position information, the navigation apparatus comprising:
a guidance-information creating unit that creates guidance information by acquiring a guiding direction, in which the vehicle should be guided, from the preset route information and the current position information;
an acoustic-image creating unit that creates an acoustic image for notifying a driver of the guidance information; and
an acoustic-image control unit that changes at least one of a movement start position of the acoustic image, a direction change position of the acoustic image, a moving amount of the acoustic image, a moving speed of the acoustic image, and a moving locus of the acoustic image according to the current position information and a guiding position in the preset route information, wherein
the acoustic-image control unit changes the moving speed of the acoustic image according to at least one of an example sentence structure of the guidance information and an environment in which the guidance information is heard.

7. The navigation apparatus according to claim 6, wherein, when the guiding direction is a driver side, the acoustic-image control unit moves the acoustic image slower than when the acoustic image is moved in a different direction from the driver side.

8. The navigation apparatus according to claim 6, wherein, when the guiding direction is a rear direction, the acoustic-image control unit moves the acoustic image slower than when the acoustic image is moved in other directions.

9. The navigation apparatus according to claim 6, wherein the acoustic-image control unit starts movement of the acoustic image from a front side of the driver.

10. The navigation apparatus according to claim 6, wherein, when the guiding direction is a rear direction, the acoustic-image control unit first moves the acoustic image to a front side, then moves the acoustic image to a rear side.

11. The navigation apparatus according to claim 6, wherein the acoustic-image control unit moves the acoustic image in an upward direction or a downward direction according to a distance between a current position and the guiding position.

12. The navigation apparatus according to claim 6, wherein
the guiding direction has information on a height, and
the acoustic-image control unit further controls a height of the acoustic image with respect to a driver.

13. The navigation apparatus according to claim 6, wherein the guiding direction is a direction in which an automatic toll collecting apparatus is present.

14. The navigation apparatus according to claim 6, further comprising a speed-information acquiring unit that acquires vehicle speed information,
wherein the acoustic-image control unit changes at least one of the movement start position of the acoustic image, the direction change position of the acoustic image, the moving amount of the acoustic image, the moving speed of the acoustic image, and the moving locus of the acoustic image according to the speed information.

15. The navigation apparatus according to claim 6, further comprising a voice-output control unit that controls at least one of a voice output of the guidance information and other voice outputs.

16. The navigation apparatus according to claim 15, wherein the voice-output control unit reverses a phase of the voice output of the guidance information that is outputted from a side different from a driver side.

17. The navigation apparatus according to claim 15, wherein the voice-output control unit controls a frequency band of the voice output of the guidance information according to a distance between a current position and the guiding position.

18. The navigation apparatus according to claim 15, wherein the voice-output control unit controls a level of a reverberant sound, which is added to the voice output of the guidance information, according to a distance between a current position and the guiding position.

19. The navigation apparatus according to claim 15, further comprising a noise-level detecting unit that detects a noise level,
wherein the voice-output control unit controls a level of the voice output of the guidance information according to the noise level detected.

20. The navigation apparatus according to claim 19, wherein the noise-level detecting unit detects the noise level based on at least one of vehicle speed information and an output from an installed microphone.

21. The navigation apparatus according to claim 15, wherein when the voice output of the guidance information is performed, the voice-output control unit lowers an output level of other voices at least one of before the voice output and during the voice output, and
the voice-output control unit recovers the output level of the other voice outputs before or after end of the voice output.

22. The navigation apparatus according to claim 21, wherein the voice-output control unit performs at least one of lowering and recovery of the output level of the other voice outputs stepwise.

23. The navigation apparatus according to claim 22, wherein the voice-output control unit performs both the lowering and the recovery stepwise, and controls a rate of the lowering and a rate of the recovery independently.

24. The navigation apparatus according to claim 23, wherein the rate of the lowering is larger than the rate of the recovery.

25. The navigation apparatus according to claim 15, wherein the voice-output control unit changes a rate of lowering of an output level of the other voice outputs according to a distance between a current position and the guiding position.

26. The navigation apparatus according to claim 15, wherein, when the voice output of the guidance information is performed, the voice-output control unit lowers an output level of the other voice outputs based on output-level adjustment information of the output level of the other voice outputs.

27. The navigation apparatus according to claim 15, further comprising an output-level detecting unit that detects an output level of the other voice outputs, wherein when the voice output of the guidance information is performed, the voice-output control unit lowers the output level of the other voice outputs according to the output level detected.

28. The navigation apparatus according to claim 15, wherein the acoustic-image control unit and the voice-output control unit control at least one of a direction change position of the acoustic image, a moving amount of the acoustic image, moving speed of the acoustic image, a moving locus of the acoustic image, a frequency band for the voice output, a reverberant sound level to be added to an output voice of the guidance information, a voice output level of the guidance information, an output level of the other voice outputs, and a speed of voice of the guidance information according to at least one of an age of a driver, listening characteristics of the driver, and a frequency of deviation from the preset route.

29. A navigation apparatus that performs a route guidance for a vehicle based on preset route information and current position information, the navigation apparatus comprising:
a guidance-information creating unit that creates guidance information by acquiring a guiding direction, in which the vehicle should be guided, from the preset route information and the current position information;
an acoustic-image creating unit that creates an acoustic image for notifying a driver of the guidance information; and
an acoustic-image control unit that changes a moving speed of the acoustic image according to at least one of an example sentence structure of the guidance information and an environment in which the guidance information is heard.

30. The navigation apparatus according to claim 29, wherein the acoustic-image control unit changes the moving speed of the acoustic image according to a length of the example sentence of the guidance information.

31. The navigation apparatus according to claim 29, wherein the acoustic-image control unit sets the moving speed in a section of a break of the guidance information higher than the moving speed in other sections.

32. The navigation apparatus according to claim 29, wherein the acoustic-image control unit moves the acoustic image in an upward direction or a downward direction according to a distance between a current position and a guiding position in the preset route information.

* * * * *